United States Patent
Tani et al.

(10) Patent No.: US 9,210,245 B2
(45) Date of Patent: Dec. 8, 2015

(54) LINKAGE SYSTEM, LINKAGE METHOD, COMPUTER READABLE RECORDING MEDIUM STORING LINKAGE PROGRAM, AND EXCHANGE

(75) Inventors: Toshiki Tani, Saitama (JP); Katsunori Endo, Tokyo (JP); Shou Mizuno, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 12/737,620

(22) PCT Filed: Sep. 17, 2009

(86) PCT No.: PCT/JP2009/066293
§ 371 (c)(1),
(2), (4) Date: Jan. 31, 2011

(87) PCT Pub. No.: WO2010/032800
PCT Pub. Date: Mar. 25, 2010

(65) Prior Publication Data
US 2011/0135076 A1    Jun. 9, 2011

(30) Foreign Application Priority Data
Sep. 18, 2008  (JP) .................................. 2008-239326

(51) Int. Cl.
*H04M 7/00* (2006.01)
*H04M 1/253* (2006.01)

(52) U.S. Cl.
CPC .......... *H04M 1/2535* (2013.01); *H04M 7/0033* (2013.01)

(58) Field of Classification Search
USPC ............. 379/112.01, 142.07, 142.15, 355.04, 379/142.13, 225, 231, 198, 272
See application file for complete search history.

(56) References Cited

U.S. PATENT DOCUMENTS

| 6,091,808 | A  |   | 7/2000 | Wood et al. |
| 7,660,597 | B2 | * | 2/2010 | Fujii ............................. 455/517 |
| 8,270,582 | B1 | * | 9/2012 | Kirchhoff et al. ........ 379/201.01 |

(Continued)

FOREIGN PATENT DOCUMENTS

| CN | 1518271 A  | 8/2004 |
| EP | 1441494 A2 | 7/2004 |

(Continued)

*Primary Examiner* — Yosef K Laekemariam
(74) *Attorney, Agent, or Firm* — Rabin & Berdo, P.C.

(57) ABSTRACT

A linkage system for linking a soft phone incorporated in an exchange and a hard phone not incorporated in the exchange, and informing the state of the linkage operation. The linkage system allows an exchange which incorporates the soft phone terminal having a telephone function to link the soft phone terminal and the hard phone not incorporated in the exchange and establishes communication between the hard phone and the call destination. The system includes a linkage information registering section for registering the soft phone terminal number received from the soft phone terminal which is the caller and linkage terminal information about the hard phone to be linked, a call processing section for making a call to the hard phone according to the linkage terminal information about the hard phone, a calling section for calling the call destination received from the soft phone when receiving a call arrival response from the hard phone, and a path setting section for setting a communication path between the hard phone and the call destination when receiving a response from the call destination.

5 Claims, 17 Drawing Sheets

(56) References Cited

U.S. PATENT DOCUMENTS

| | | |
|---|---|---|
| 2004/0152467 A1 | 8/2004 | Fujii |
| 2006/0239252 A1* | 10/2006 | Kantak et al. ............... 370/352 |
| 2007/0019630 A1 | 1/2007 | Kashimoto et al. |
| 2007/0121827 A1* | 5/2007 | Urayama et al. ........... 379/90.01 |

FOREIGN PATENT DOCUMENTS

| | | | | |
|---|---|---|---|---|
| JP | 09-093630 A | 4/1997 | | |
| JP | 10-155168 A | 6/1998 | | |
| JP | 2001-502505 T | 2/2001 | | |
| JP | 2003-078932 A | 3/2003 | | |
| JP | 2004-229151 A | 8/2004 | | |
| JP | 2007-013684 A | 1/2007 | | |
| JP | 2008-141491 A | 6/2008 | | |
| WO | WO-2005/101857 A1 | 10/2005 | | |
| WO | WO 2007/025311 | * 1/2007 | ............. | H04M 1/64 |
| WO | WO 2007/025311 | * 3/2007 | ............. | H04M 1/64 |
| WO | WO-2007/025311 A2 | 3/2007 | | |
| WO | WO2008/037767 | * 4/2008 | ............. | H04M 7/00 |

* cited by examiner

9 PBX

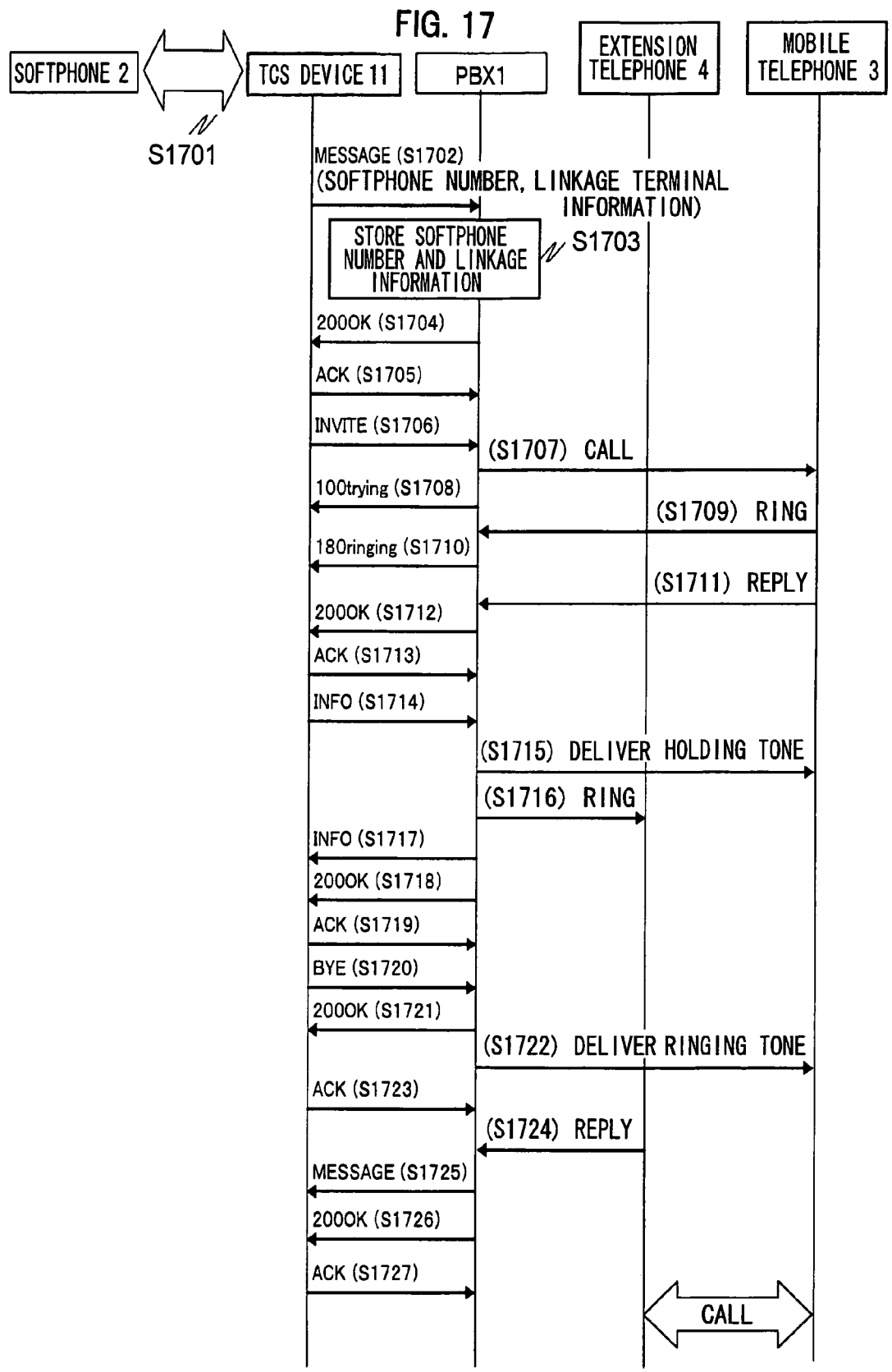

LINKAGE SYSTEM, LINKAGE METHOD, COMPUTER READABLE RECORDING MEDIUM STORING LINKAGE PROGRAM, AND EXCHANGE

TECHNICAL FIELD

The present invention relates to a linkage system, a linkage method, a computer readable recording medium storing a linkage program, and an exchange. The present invention can be applied to an exchange system which, in an exchange having the function of linking a softphone and a hardphone, for example, performs linkage processing even with a hardphone not accommodated in the exchange.

RELATED ART

Conventionally, telephones used in business have been analog telephones, digital multi-function telephones, PHS terminals, wireless IP telephones, etc. accommodated in a private branch exchange (hereinafter called a PBX).

As a technology relating to linkage processing in a conventional private branch exchange, there is, for example, the technology described in Japanese Patent Application Laid-Open (JP-A) No. 10-155168.

JP-A No. 10-155168 describes a technology which, in a private branch exchange accommodating a wired telephone and a cordless telephone such as a PHS, allows a user to utilize the wired telephone when the user is at his/her desk, and transfers to the cordless telephone when the user is away from his/her desk.

Incidentally, in recent years, PC phone (hereinafter called "softphone") technology, in which a phone application is installed on a personal computer, and with which calls can be made using a headset connected by a USB or the like, is becoming widespread.

This softphone is connected to the private branch exchange (PBX) using the IP (Internet Protocol). For this reason, as long as the softphone is within a LAN connected to the PBX, no matter where the user moves, the softphone can perform IP connection, and can be used as a telephone at the destination. Consequently, softphones are very convenient.

Further, a softphone usually has functions such as a phonebook function and a function of knowing the status of the other party (e.g., a presence function). For example, with a softphone, the user can confirm beforehand the status of the party, to which the user wants to call to through a screen, before placing the call. Further, with a softphone, when the party is present, the user can ring the party simply by clicking from a phonebook displayed on the screen.

Most recently, a private branch exchange that performs linkage processing between a hardphone such as a PHS terminal and a softphone, has also been proposed.

DISCLOSURE OF THE INVENTION

Problem to be Solved by the Invention

The technology described in JP-A No. 10-155168 is a technology that performs linkage processing between a wired telephone and a cordless telephone accommodated in the same PBX.

However, in the technology described in JP-A No. 10-155168, the assumption is that the target of linkage processing is accommodated in the same PBX. Consequently, when the wired telephone and the cordless telephone that are to be linked are not connected to the same PBX, the technology described in JP-A No. 10-155168 cannot perform linkage processing.

Today, softphones, which are applications having a phone function, and mobile telephones are used often. However, it has not always been the case that linkage-operated softphones and hardphones are connected to the same PBX.

For example, there are cases where a PBX cannot accommodate a hardphone such as a PHS terminal or a mobile terminal, and there are cases where an individual cannot be allowed to carry a single hardphone such as a PHS terminal. Further, there are also cases where, even if each and every individual were allowed to carry a hardphone such as a mobile telephone, the hardphones cannot be accommodated in the same PBX accommodating softphones, and linkage between the softphones and the hardphones cannot be performed.

Further, for example, when using an old PBX that cannot accommodate a softphone or using a PBX that does not have a hardphone linkage function, there are also cases where linkage to a hardphone cannot be performed.

Thus, the present invention provides a linkage system, a linkage method, a linkage program, and an exchange that can link a softphone accommodated in an exchange and a hardphone not accommodated in the exchange, and can give notification of the status of the linkage operation.

Method of Solving the Problem

A first aspect of the present invention is a linkage system that allows an exchange, accommodating a softphone terminal having a phone function, to link the softphone terminal and a hardphone not accommodated in the exchange, and that establishes a call between the hardphone and a call destination, the linkage system including: (1) a linkage information registration section that registers a number of the softphone terminal that has been received from the softphone terminal which is a call source, and linkage terminal information of the hardphone to be linked; (2) a call processing section that makes a call with respect to the hardphone on the basis of the linkage terminal information of the hardphone in the linkage information registration section; (3) a ring processing section that performs ring processing with respect to the call destination that has been received from the softphone, when it receives an incoming reply from the hardphone; and (4) a path setting section that sets a call path between the hardphone and the call destination when it receives a reply from the call destination.

A second aspect of the present invention is a linkage method that allows an exchange, accommodating a softphone terminal having a phone function, to link the softphone terminal and a hardphone not accommodated in the exchange, and that establishes a call between the hardphone and a call destination, with a linkage system of the exchange being equipped with a linkage information registration section that registers a number of the softphone terminal that has been received from the softphone terminal which is a call source and linkage terminal information of the hardphone to be linked, a call processing section, a ring processing section, and a path setting section, the linkage method including: (1) a call processing step in which the call processing section makes a call with respect to the hardphone based on the linkage terminal information of the hardphone in the linkage information registration section; (2) a ring processing step in which the ring processing section performs ring processing with respect to the call destination that has been received from the softphone when it receives an incoming reply from the hardphone; and (3) a path setting step in which the path setting section sets a call path between the hardphone and the call destination when it receives a reply from the call destination.

A third aspect of the present invention is a linkage program that allows an exchange, accommodating a softphone terminal having a phone function, to link the softphone terminal and a hardphone not accommodated in the exchange, and that establishes a call between the hardphone and a call destination, the linkage program causing an exchange equipped with a linkage information registration section that registers a number of the softphone terminal that has been received from the softphone terminal which is a call source and linkage terminal information of the hardphone to be linked to function as: (1) a call processing section that makes a call with respect to the hardphone based on the linkage terminal information of the hardphone in the linkage information registration section; (2) a ring processing section that performs ring processing with respect to the call destination that has been received from the softphone when it receives an incoming reply from the hardphone; and (3) a path setting section that sets a call path between the hardphone and the call destination when it receives a reply from the call destination.

A fourth aspect of the present invention is an exchange that accommodates a softphone terminal having a phone function, wherein the exchange is equipped with the linkage system of the first invention.

Effect of the Invention

According to the present invention, a softphone accommodated in an exchange and a hardphone not accommodated in the exchange can be linked, and notification can be given of the status of the linkage operation.

BRIEF DESCRIPTION OF THE DRAWINGS

FIG. 17 is a sequence diagram showing linkage processing between a softphone and a hardphone of the sixth embodiment.

BEST MODE OF IMPLEMENTING THE INVENTION (A) First Embodiment

Below, a first embodiment of the linkage system, the linkage method, the linkage program, and the exchange of the present invention will be described with reference to the drawings.

In the first embodiment, an embodiment in a case where, even when a linkage-operated hardphone is not connected to a private branch exchange accommodating a softphone, the present invention is utilized to perform linkage processing between the hardphone and the softphone, will be described.

(A-1) Configuration of First Embodiment

Figure 1:
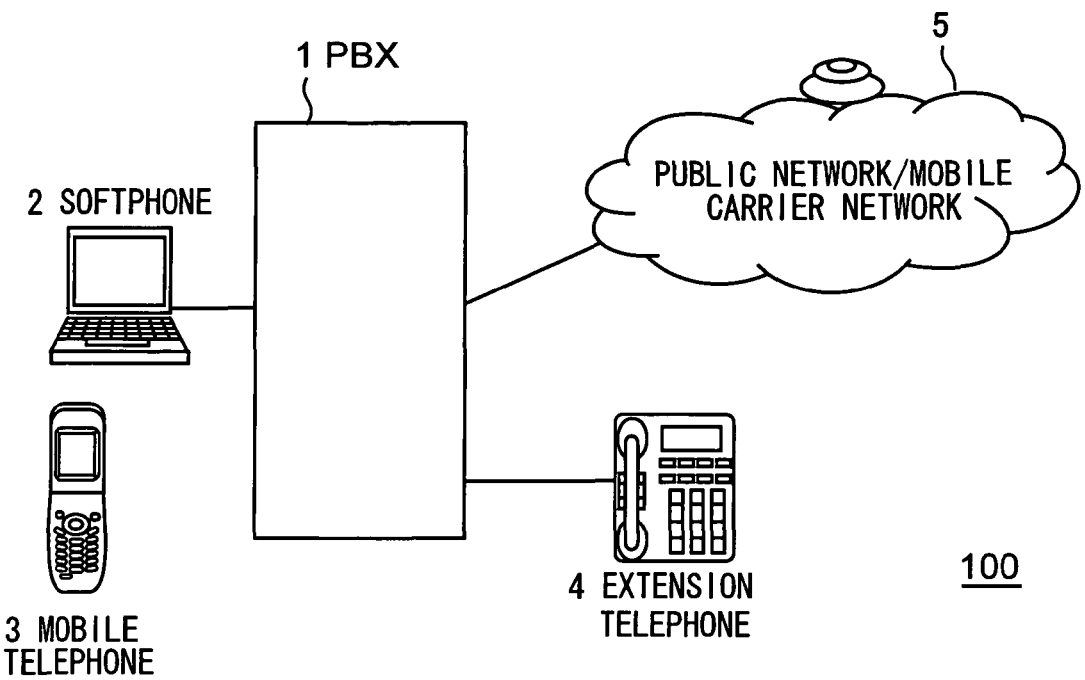
FIG. 1 is a configuration diagram showing the configuration of an exchange system of a first embodiment.

FIG. 1 is a configuration diagram showing the configuration of an exchange system of the first embodiment. In FIG. 1, an exchange system 100 of the first embodiment includes at least a private branch exchange (PBX) 1, a softphone 2, a mobile telephone 3, an extension telephone 4, and a public network and mobile carrier network (public network/mobile carrier network) 5.

The private branch exchange (PBX) 1 accommodates the softphone 2 and the extension telephone 34, performs call connection control between these accommodated terminals, and performs outside call connection control between itself and the public network/mobile carrier network 5 to which it is connected.

Figure 2:
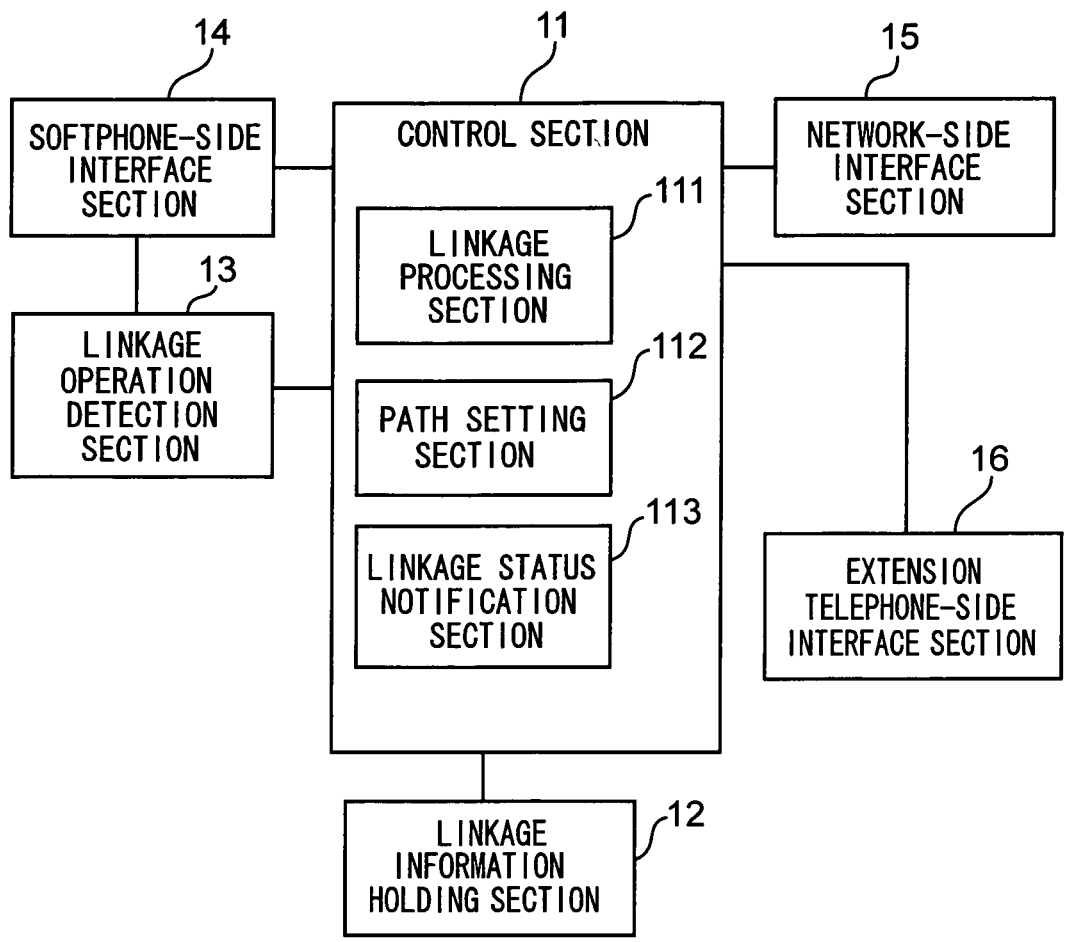
FIG. 2 is an internal configuration diagram showing the internal configuration of a PBX of the first embodiment.

FIG. 2 is an internal configuration diagram of the main internal functions of the PBX 1. As shown in FIG. 2, the PBX 1 includes at least a control section 11, a linkage information holding section 12, a linkage operation detection section 13, a softphone-side interface 14, a network-side interface 15, and an extension telephone-side interface section 16.

The control section 11 performs connection control as the private branch exchange. Further, the control section 11 performs linkage processing between the softphone 2 and the mobile telephone 3. As functions of the linkage control performed by the control section 11, as shown in FIG. 2, there are a linkage processing section 111, a path setting section 112, and a linkage status notification section 113.

The linkage processing section 111 stores a number of the call source softphone 2 and linkage terminal information in the linkage information holding section 12 when the later-described linkage operation section 13 detects linkage terminal information via the softphone-side interface section 14. Thus, the linkage processing section 111 stores a correspondence relationship between the linkage-operated softphone 2 and hardphone (the mobile telephone 3).

Further, the linkage processing section 111 performs call and ring processing of the mobile telephone 3 via the public network/mobile carrier network 5 on the basis of a phone number of the mobile telephone 3 included in the linkage terminal information it has received.

Moreover, when the linkage processing section 111 confirms a reply from the linkage-operated mobile telephone 3, it places the mobile telephone 3 on hold, and performs ring processing of the extension telephone 4 which is a call-designated call destination from the call source softphone 2.

Further, when it performs extension ringing of the extension telephone 4, the linkage processing section 111 references the number of the softphone 2 and the mobile number of the mobile telephone 3 in the linkage information holding section 12, extension-transfers the softphone 2 to the mobile telephone 3, and places the mobile telephone 3 in ringing.

The path setting section 112 sets a call path between the mobile telephone 3 and the extension telephone 4, when there is a reply from the extension telephone 4.

The linkage status notification section 113 notifies the softphone 2 that a call is in progress between the mobile telephone 3 and the extension telephone 4, when a call between the mobile telephone 3 which is the linkage target and the call destination extension telephone 4 is established.

The linkage information holding section 12 holds the phone number of the call source softphone 2 and the linkage terminal information it has received from the call source softphone 2.

The linkage operation detection section 13 monitors call information from the softphone 2 which is the call source via the softphone-side interface section 14, and judges whether or not linkage terminal information has been transmitted. When the linkage operation detection section 13 detects reception of linkage terminal information, it relays an indication thereof to the control section 11, to cause the control section 11 to perform linkage processing.

The softphone-side interface section 14 is an interface that transmits signals to and receives signals from the softphone 2 (personal computer) by, for example, SIP (Session Initiation Protocol) communication protocol. Further, the network-side interface section 15 is an interface that transmits signals to and receives signals from the public network/mobile carrier network 5. Moreover, the extension telephone-side interface section 16 is an interface that transmits signals to and receives signals from the extension telephone 4.

The softphone 2 is an application that is installed in a personal computer (a communication terminal) and realizes a phone function. The softphone 2 realizes, for example, a phonebook function, a call function, a function of confirming that the party the user wants to call is at his/her desk (a presence function), etc., through a display screen shown on a PC screen or PC operation by the user. Further, as the personal computer on which the softphone 2 is implemented, a desktop PC or a note PC equipped with a communication function can be applied, and a personal computer that can connect to the PBX 1 by a wired line or a wireless line can be applied.

Further, the softphone 2 is, in addition to the existing phone function, the call function, the presence function, etc., equipped with a function for requesting, of the PBX 1, linkage processing between the softphone 2 and the mobile telephone 3.

Figure 3:
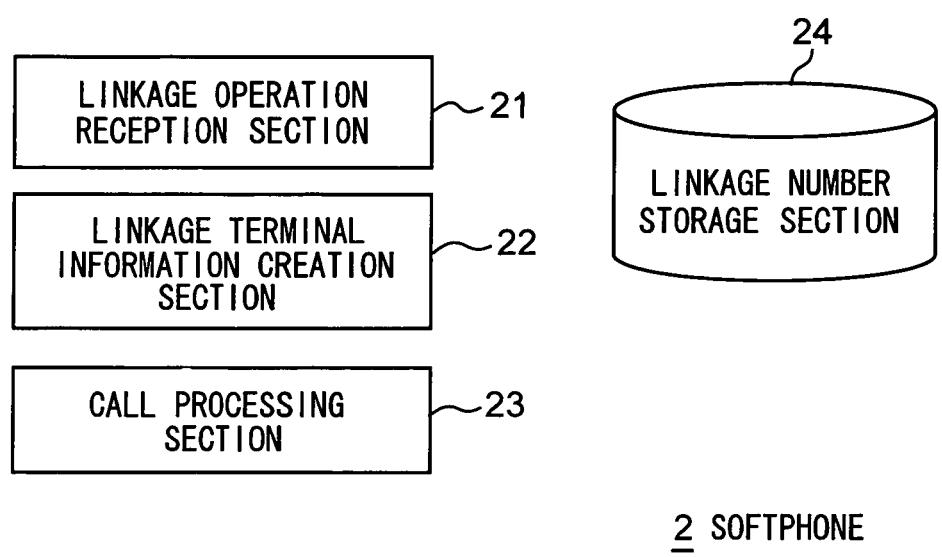
FIG. 3 is a block diagram showing the functional configuration of a softphone of the first embodiment.

FIG. 3 is a block diagram showing functions by which the softphone 2 performs request processing of linkage processing with respect to the PBX 1. As shown in FIG. 3, the softphone 2 includes at least a linkage operation reception section 21, a linkage terminal information creation section 22, a call processing section 23, and a mobile number storage section 24.

The linkage operation reception section 21 receives user operations and receives the start of linkage processing between the softphone 2 and the mobile telephone 3 in the PBX 1. For example, the linkage operation reception section 21 performs reception of linkage processing to the mobile telephone 3 as a result of a caller utilizing the phonebook held by the softphone 2, to perform an operation that rings the extension telephone 4.

The linkage terminal information creation section 22 creates linkage terminal information, by using the mobile phone number of the mobile telephone 3 stored in the mobile number storage section 24, that detects the start of linkage processing to the mobile telephone 3 by the linkage operation reception section 21.

Here, the linkage terminal information is information informing the PBX 1 of the mobile phone number of the mobile telephone 3 serving as the linkage target and is, for example, information including a dial-out prefix and the mobile phone number of the mobile telephone 3.

The call processing section 23 receives PC operations by the user and sends the linkage terminal information that has been created in the linkage terminal information creation section 22 to the PBX 1. The call processing section 23 applies the normal call processing function of the softphone 2.

The mobile number storage section 24 is a storage region that stores beforehand the mobile phone number of the mobile telephone 3 that serves as the linkage target.

The mobile telephone 3 is an existing mobile telephone carried by the user. In the first embodiment, description will be given in a case where a mobile telephone carried by the individual user who utilizes the softphone 2.

The extension telephone 4 is an extension telephone accommodated in the PBX 1. As the extension telephone 4, existing extension telephones can be widely applied, and both an extension telephone connected by a wired line and an extension telephone connected by a wireless line can be applied. As the extension telephone 4, for example, an analog telephone, a digital multi-function telephone, a PHS terminal, a wireless IP telephone, etc., correspond.

The public network/mobile carrier network 5 is a public network and a mobile carrier network and is a communication network that realizes calls with the mobile telephone 3.

(A-2) Operation of First Embodiment

Next, the operation of linkage processing to the mobile telephone 3 in the exchange system 100 of the first embodiment will be described with reference to the drawings.

Below, an operation where a caller using the softphone 2 rings the extension telephone 4 while linking the softphone 2 and the mobile telephone 3, will be exemplified and described.

Figure 4:
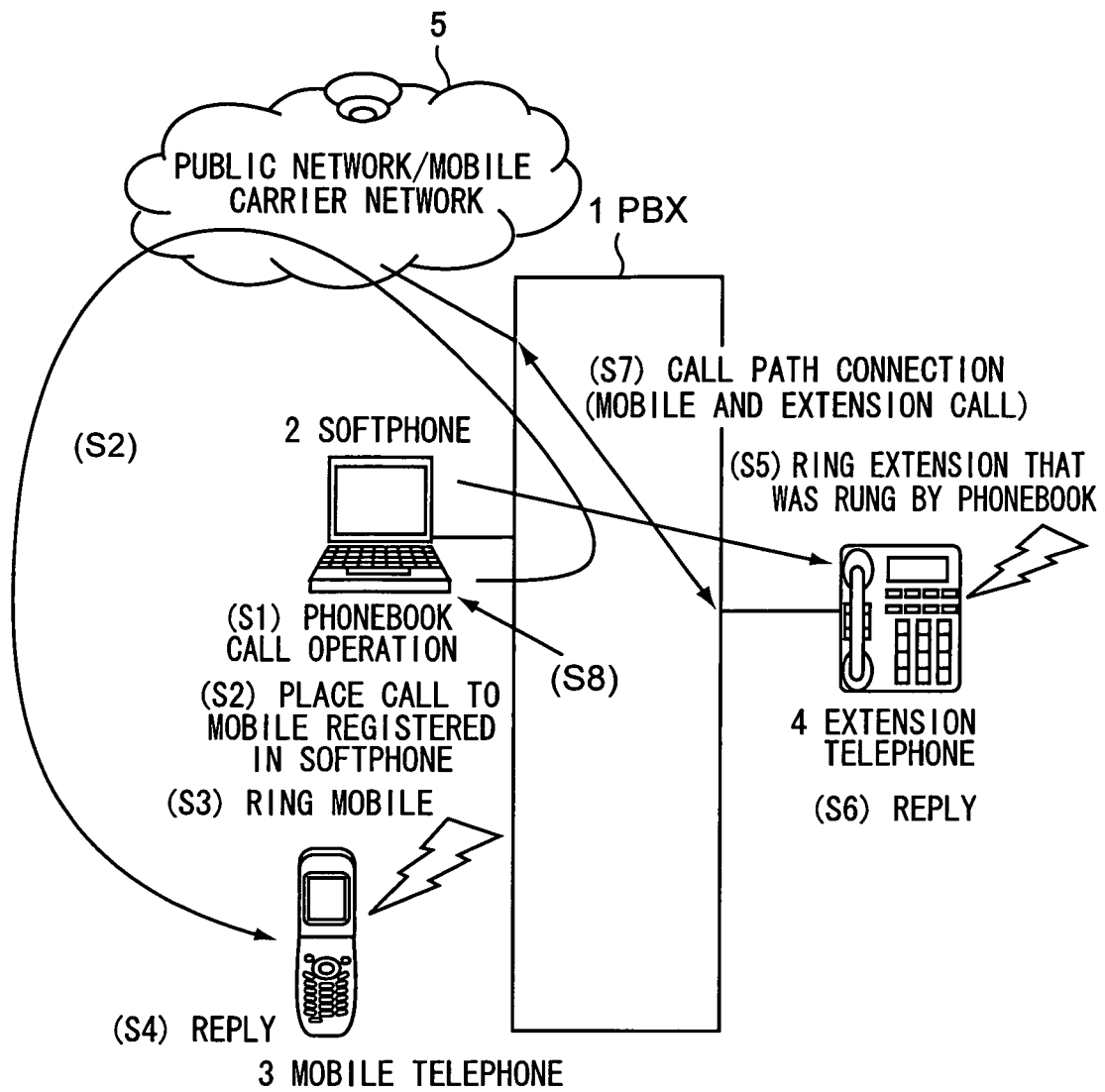
FIG. 4 is an explanatory diagram explaining a linkage operation between a softphone and a hardphone in the exchange system of the first embodiment.

FIG. 4 is an explanatory diagram explaining the linkage operation between the softphone 2 and the mobile telephone 3. Further, FIG. 5 is a sequence showing linkage processing between the softphone 2 and the mobile telephone 3.

First, the caller utilizes the phonebook held by the softphone 2 to perform an operation that rings the extension telephone 4. Because of this operation, in the softphone 2, the linkage operation reception section 21 detects the start of the linkage operation, the linkage terminal information creation section creates the linkage terminal information, and the call processing section 23 transmits information (MESSAGE), including the softphone number and the linkage terminal information, to the PBX 1 (S101 in FIG. 5).

Here, as described above, the linkage terminal information is information including the dial-out prefix and the mobile phone number of the mobile telephone 3.

Figure 5:
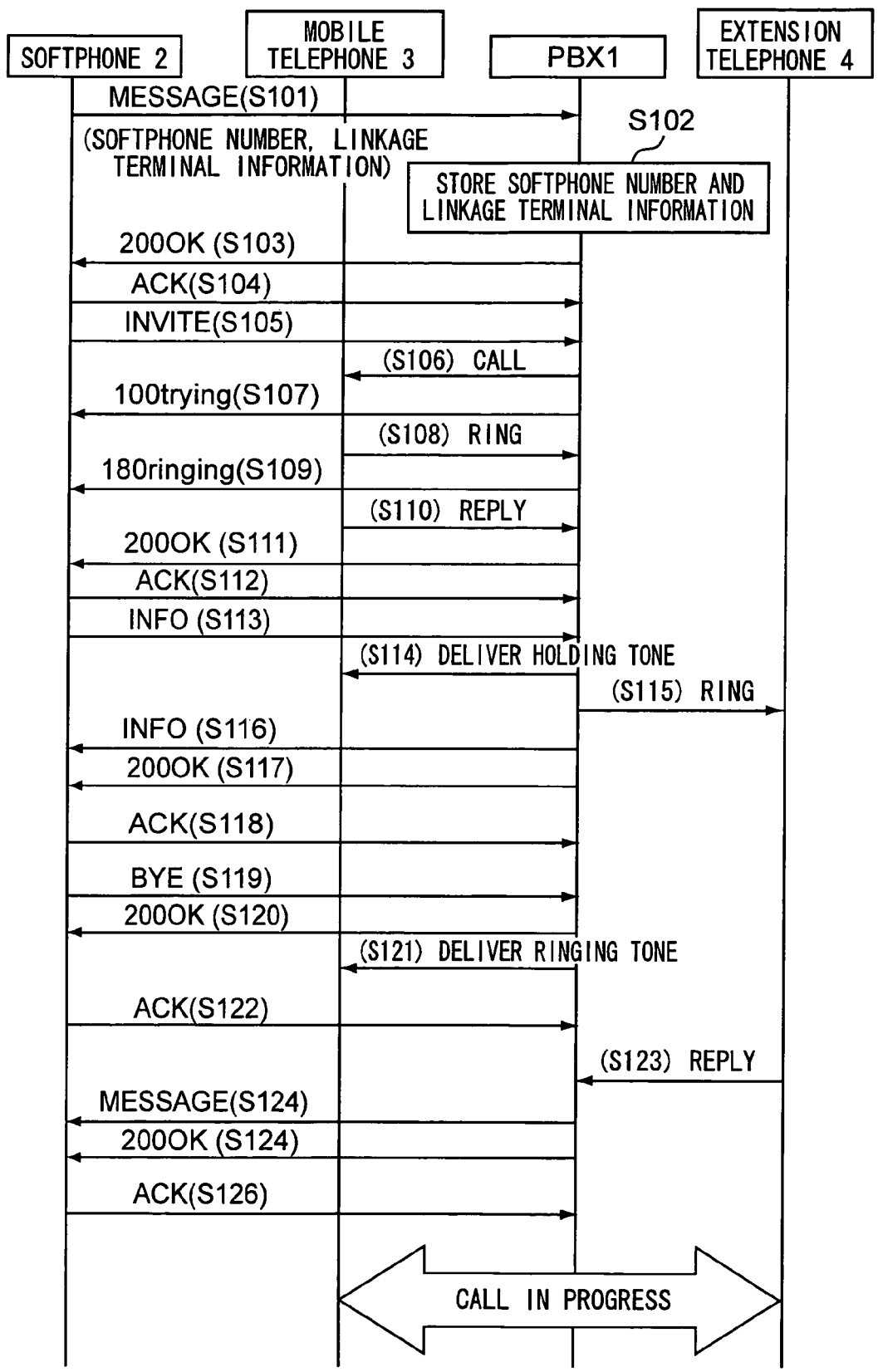
FIG. 5 is a sequence diagram showing linkage processing between the softphone and the hardphone of the first embodiment.

In the PBX 1, when the linkage operation detection section 13 detects the linkage terminal information, the linkage processing section 111 of the control section 11 stores the softphone number and the linkage terminal information in the linkage information holding section 12 (S102 in FIG. 5).

When the softphone number and the linkage terminal information are stored in the PBX 1 (S103 and S104 in FIG. 5), the softphone 2 performs a call operation using the extension telephone 4 as the call destination (S1 in FIG. 4, S105 in FIG. 5).

When it receives a call request from the softphone 2 to the extension telephone 4, in the PBX 1, the linkage processing section 111 uses the mobile phone number of the mobile telephone 3 held in the linkage information holding section 12 to place a call to the mobile telephone 3 via the public network/mobile carrier network 5 (S2 in FIG. 4, S106 in FIG. 5) and ring the mobile telephone 3 (S3 in FIGS. 4, S107 to S109 in FIG. 5).

When it receives the ring from the PBX 1 and the user operates the mobile telephone 3 and replies (S4 in FIG. 4, S110 in FIG. 5), the PBX 1 notifies the softphone 2 thereof (S111 and S112 in FIG. 5).

Then, when it confirms that the mobile telephone 3 has replied, the softphone 2 requests the PBX 1 to call the call-designated extension telephone 4 (S113 in FIG. 5). Receiving this, the PBX 1 delivers a holding tone to the mobile telephone 3 (S114 in FIG. 5), and thereafter the linkage processing section 111 places a call to the extension telephone (S5 in FIG. 4, S115 in FIG. 5).

The PBX 1 notifies the softphone 2 that it has placed a call to the extension telephone 4 (S116 to S120 in FIG. 5) and delivers a ringing tone indicating that it is ringing the extension telephone 4 to the mobile telephone 3 (S121, S122 in FIG. 5).

When the extension telephone 4 that has received the ring from the PBX 1 replies (S6 in FIG. 4, S123 in FIG. 5), in the PBX 1, the path setting section 112 establishes a path between the mobile telephone 3 and the extension telephone 4 (S7 in FIG. 4), and the linkage status notification section 113 notifies the softphone 2 that a call is in progress between the mobile telephone 3 and the extension telephone 4 (S8 in FIGS. 4, S124 to S126 in FIG. 5).

At this time, the softphone 2 displays on the PC screen content indicating that a call is in progress, such as "Call in progress", for example, on the basis of the notification.

(A-3) Effects of First Embodiment

As described above, according to the first embodiment, even when a hardphone is not connected to a PBX accommodating a softphone, linkage processing between the softphone and the hardphone can be performed, and notification that the softphone and the hardphone are linked can be given.

(B) Second Embodiment

Next, a second embodiment of the linkage system, the linkage method, the linkage program, and the exchange of the present invention will be described with reference to the drawings.

In the second embodiment, an embodiment where the present invention is utilized to utilize an existing PBX that cannot accommodate a softphone and thereby perform linkage between a hardphone accommodated by the existing PBX and a softphone, will be described.

(B-1) Configuration and Operation of Second Embodiment

Figure 6:
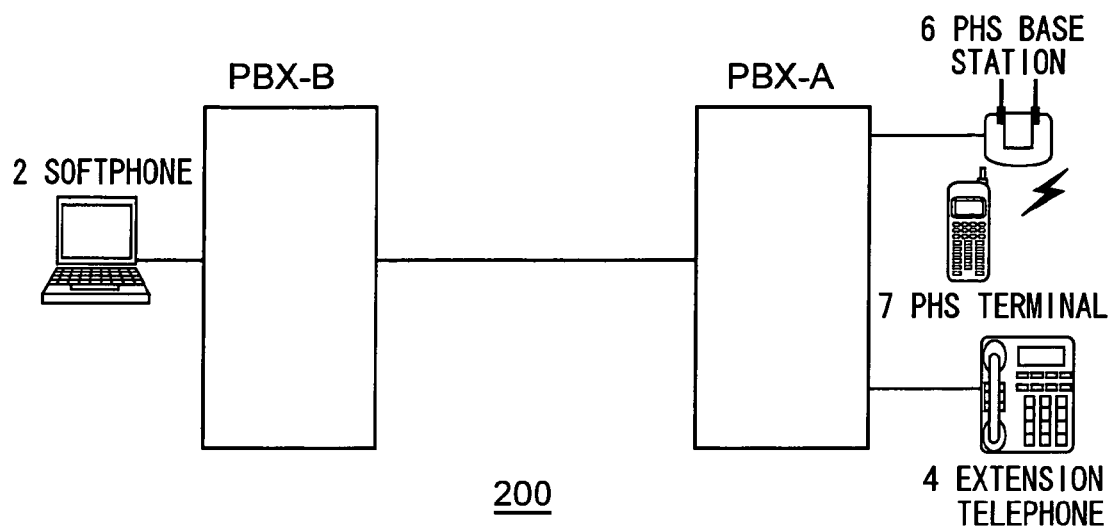
FIG. 6 is a configuration diagram showing the configuration of an exchange system of a second embodiment.

FIG. 6 is a configuration diagram showing the configuration of an exchange system of the second embodiment. In FIG. 6, an exchange system 200 of the second embodiment is configured to include at least a PBX-A, a PHS base station 6 connected to the PBX-A, a PHS terminal 7 accommodated in the PBX-A via the PHS base station 6, an extension telephone 4 connected to the PBX-A, a PBX-B, and a softphone 2.

The PBX-A accommodates the PHS terminal 7 via the PHS base station 6 and the extension telephone 4, and is an existing private branch exchange that cannot accommodate the softphone 2. The PBX-A performs call connection control between accommodated terminals in regard to the PHS terminal 7 and the accommodated extension telephone 4. The connection control method of the PBX-A as a private branch exchange is not particularly limited, and existing technologies can be widely applied.

The PBX-B is a private branch exchange that can accommodate the softphone 2. In the second embodiment, by connecting the PBX-B to the PBX-A via a dedicated line, the PBX-B realizes linkage between the hardphone accommodated in the PBX-A and the softphone.

The softphone 2 has the same functions as those of the softphone 2 of the first embodiment, and a ring number of the PHS terminal of the user (a PBX-A dedicated line call number+a PHS extension number) is registered beforehand in the softphone 2.

Figure 7:
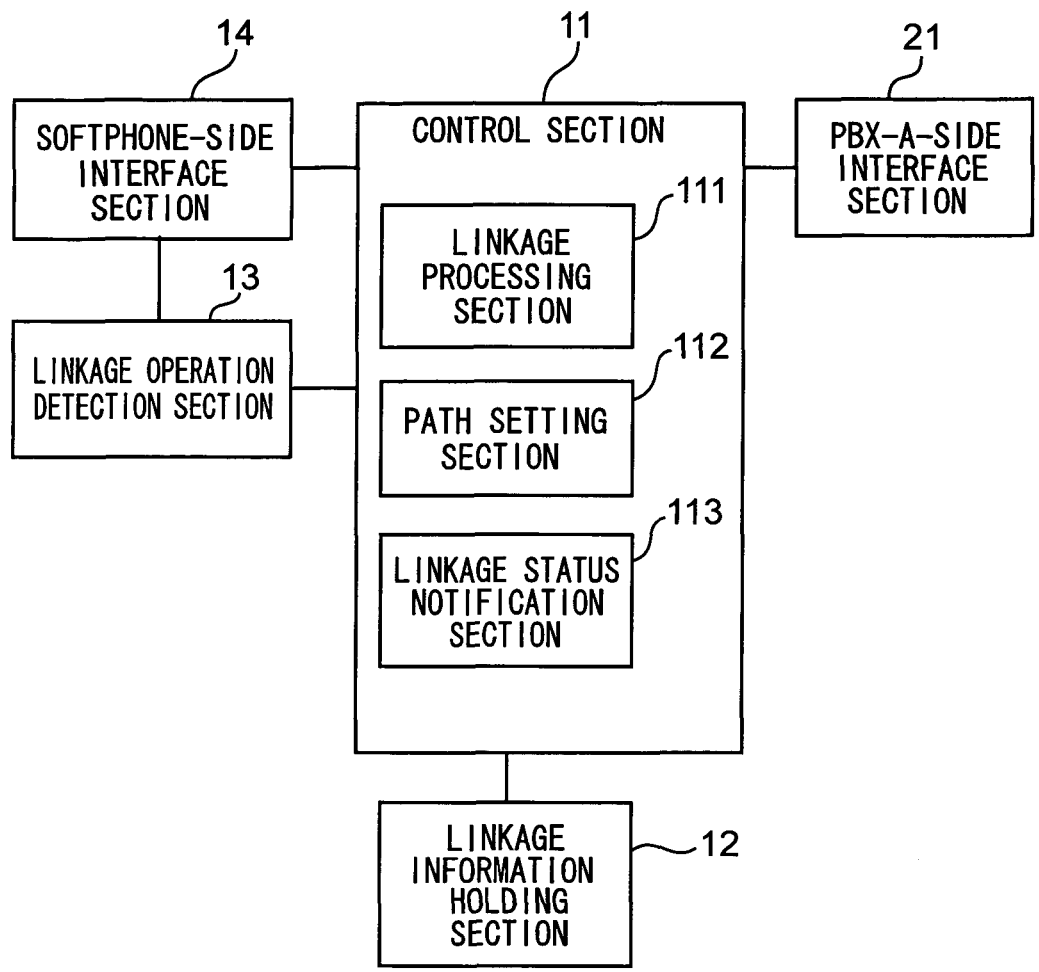
FIG. 7 is an internal configuration diagram showing the internal configuration of a PBX of the second embodiment.

FIG. 7 is an internal configuration diagram showing the main internal functions of the PBX-B. In FIG. 7, the PBX-B includes at least a control section 11, a linkage information holding section 12, a linkage operation detection section 13, a softphone-side interface 14, and a PBX-A-side interface 21.

As shown in FIG. 7, the PBX-B differs from the PBX 1 of the first embodiment in that it is equipped with an interface section on the PBX-A side, and other components correspond to the components of the PBX 1 of the first embodiment.

Figure 8:
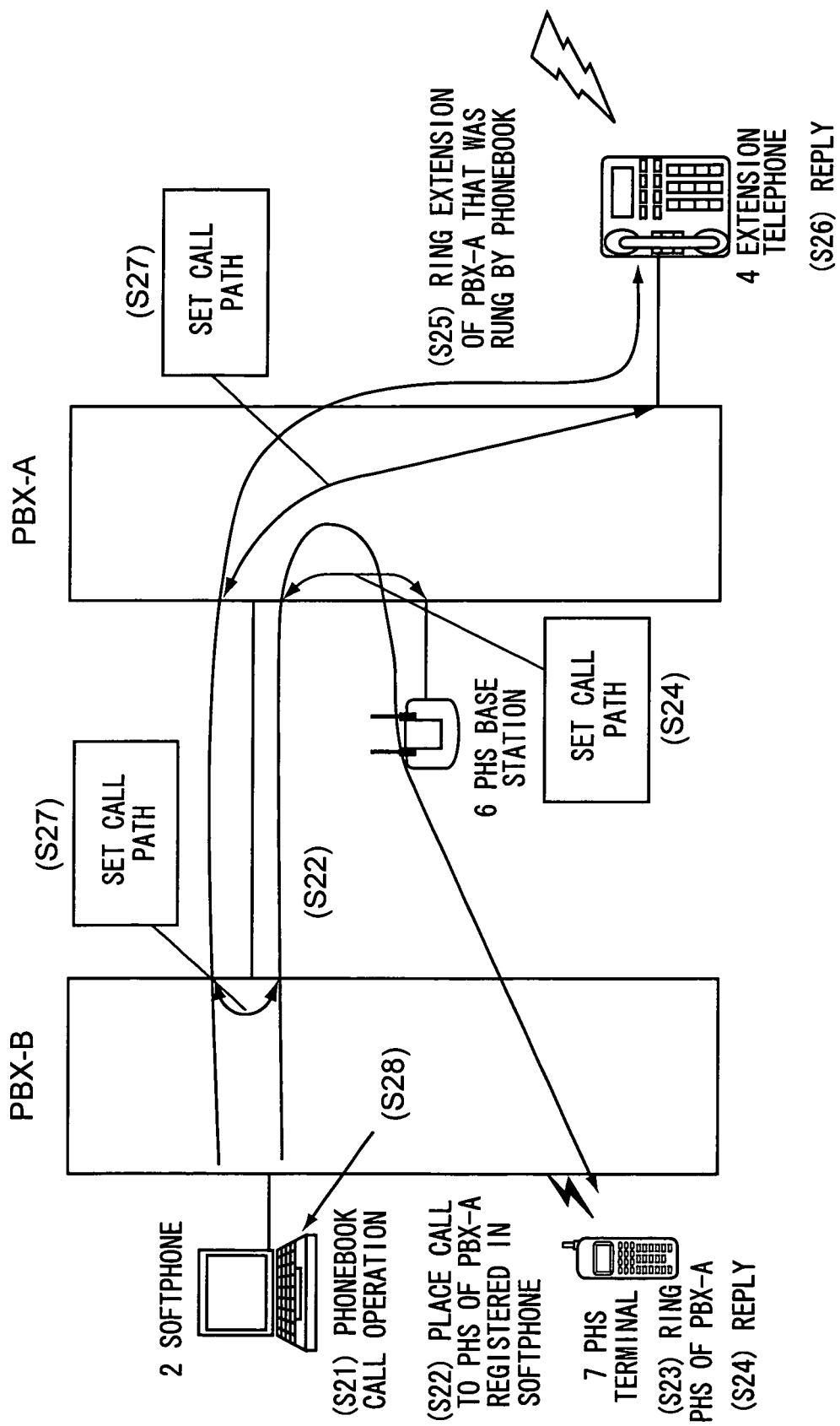
FIG. 8 is an explanatory diagram explaining a linkage operation between a softphone and a hardphone in the exchange system of the second embodiment.

FIG. 8 is an explanatory diagram explaining the operation of linkage processing between the softphone 2 and a hardphone in the exchange system 200 of the second embodiment.

Below, an operation when a caller using the softphone 2 rings the extension telephone 4 while linking the softphone 2 and the PHS terminal 7, will be exemplified.

The caller starts up the softphone 2 on the personal computer, and utilizes the phonebook held by the softphone 2 that starts the linkage operation to perform an operation that rings the extension telephone 4 (S21). Because of this operation, in the softphone 2, the linkage operation reception section 21 detects the start of the linkage operation, the linkage terminal information creation section creates the linkage terminal information, and the call processing section 23 transmits information (MESSAGE) including the softphone number and the linkage terminal information to the PBX-B.

Here, the linkage terminal information is information including the PBX-A dedicated line call number and the PHS extension number.

In the PBX-B, when the linkage operation detection section 13 detects the linkage terminal information, the linkage processing section 111 of the control section 11 stores the softphone number and the linkage terminal information in the linkage information holding section 12.

When the softphone number and the linkage terminal information are stored in the PBX-B, the softphone 2 is called using the extension telephone 4 as the call destination (S22).

When it receives a call request from the softphone 2 to the extension telephone 4, the PBX-B places a call to the PHS terminal 7 accommodated in the PBX-A via the dedicated line on the basis of the PBX-A dedicated line number and the PHS extension number of the PHS terminal 7. At this time, the PBX-A that has received the call request from the PBX-B rings the PHS terminal 7 via the PHS base station 6 on the basis of the extension number of the PHS terminal 7 which is the call destination (S23).

When it receives the ring from the PBX-A and the user operates the PHS terminal 7 and replies, the PBX-A sets a call path between the dedicated line that has been rung from the PBX-B and the PHS base station 6 (S24).

When the softphone 2 confirms the reply from the PHS terminal 7, the softphone 2 sends the extension number of the call-designated extension telephone 4 to the PBX-B and calls the extension telephone 4 accommodated in the PBX-A via the dedicated line (S25).

At this time, the PBX-B notifies the softphone 2 that it has placed a call to the extension telephone 4, and delivers a ringing tone indicating that it is ringing the extension telephone 4 to the PHS terminal 7.

Then, when the extension telephone 4 that has received the ring from the PBX-A replies (S26), the PBX-B sets a call path between the dedicated line of the PBX-A extension telephone 4 and the dedicated line of the PBX-A PHS terminal 7. Further, the PBX-A sets a call path with the dedicated line that has been rung from the PBX-B. Further, the PBX-B sets a call path of the dedicated line ringing the extension telephone 4 of the PBX-A and the PHS base station 6 of the PBX-A (S27). Thus, a call is established between the extension telephone 4 accommodated in the PBX-A and the PHS terminal 7 accommodated in the PBX-A.

Further, the PBX-B notifies the softphone 2 of the call status (e.g., "call in progress", etc.) between the extension telephone 4 accommodated in the PBX-A and the PHS terminal 7 accommodated in the PBX-A.

At this time, the softphone 2 displays on the PC screen content indicating that a call is in progress, such as "Call in progress", for example, on the basis of the notification.

(B-2) Effects of Second Embodiment

As described above, according to the second embodiment, even when the exchange system is equipped with an existing PBX that cannot accommodate a softphone, by newly installing the PBX-B that accommodates a softphone, linkage between the softphone and a hardphone can be performed and the softphone can be notified of the call status like in the first embodiment.

(C) Third Embodiment

Next, a third embodiment of the linkage system, the linkage method, the linkage program, and the exchange of the present invention will be described with reference to the drawings.

(C-1) Third Embodiment and Operation

Figure 9:
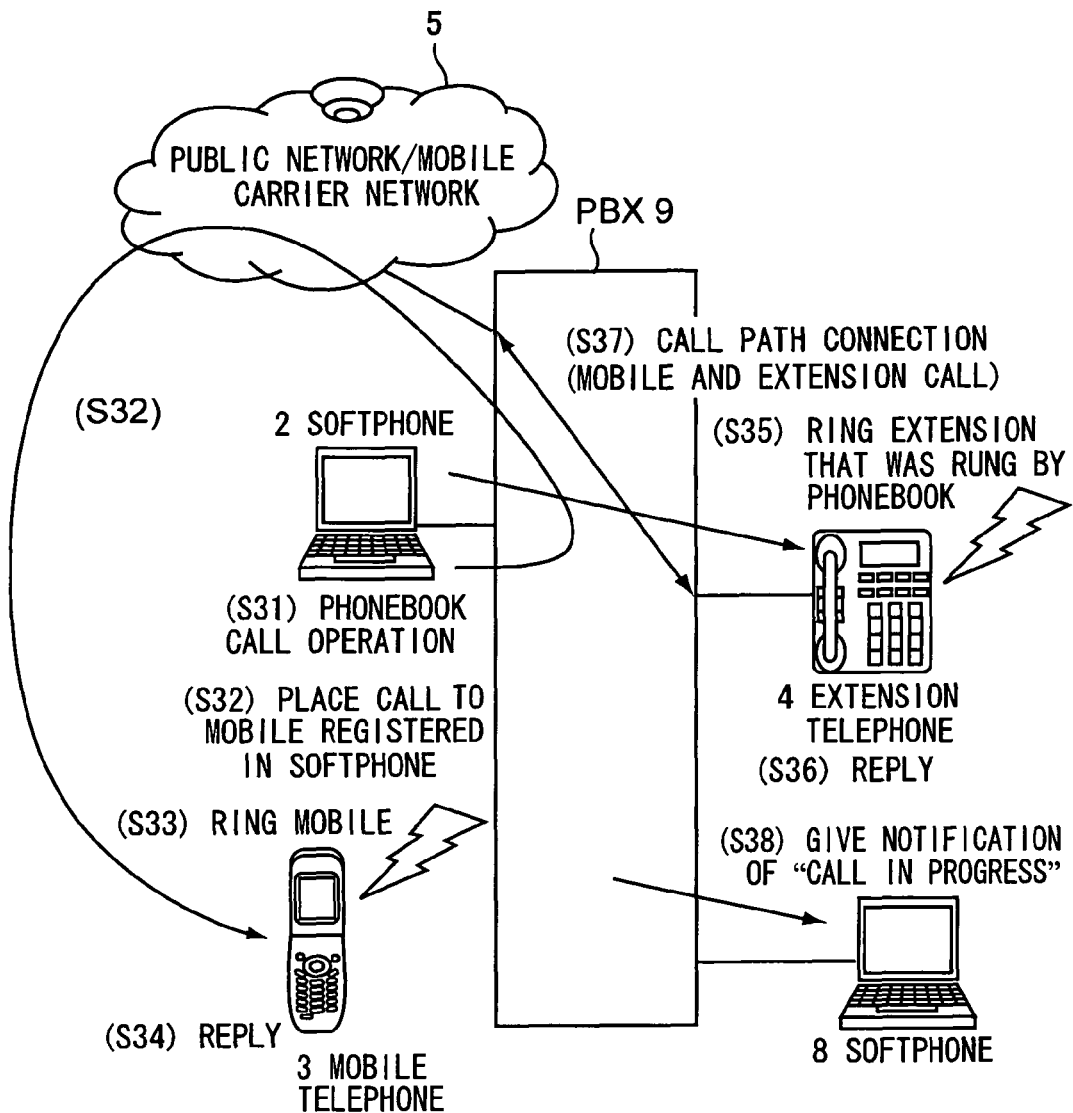
FIG. 9 is an explanatory diagram explaining a linkage operation between a softphone and a hardphone in an exchange system of a third embodiment.
Figure 10:
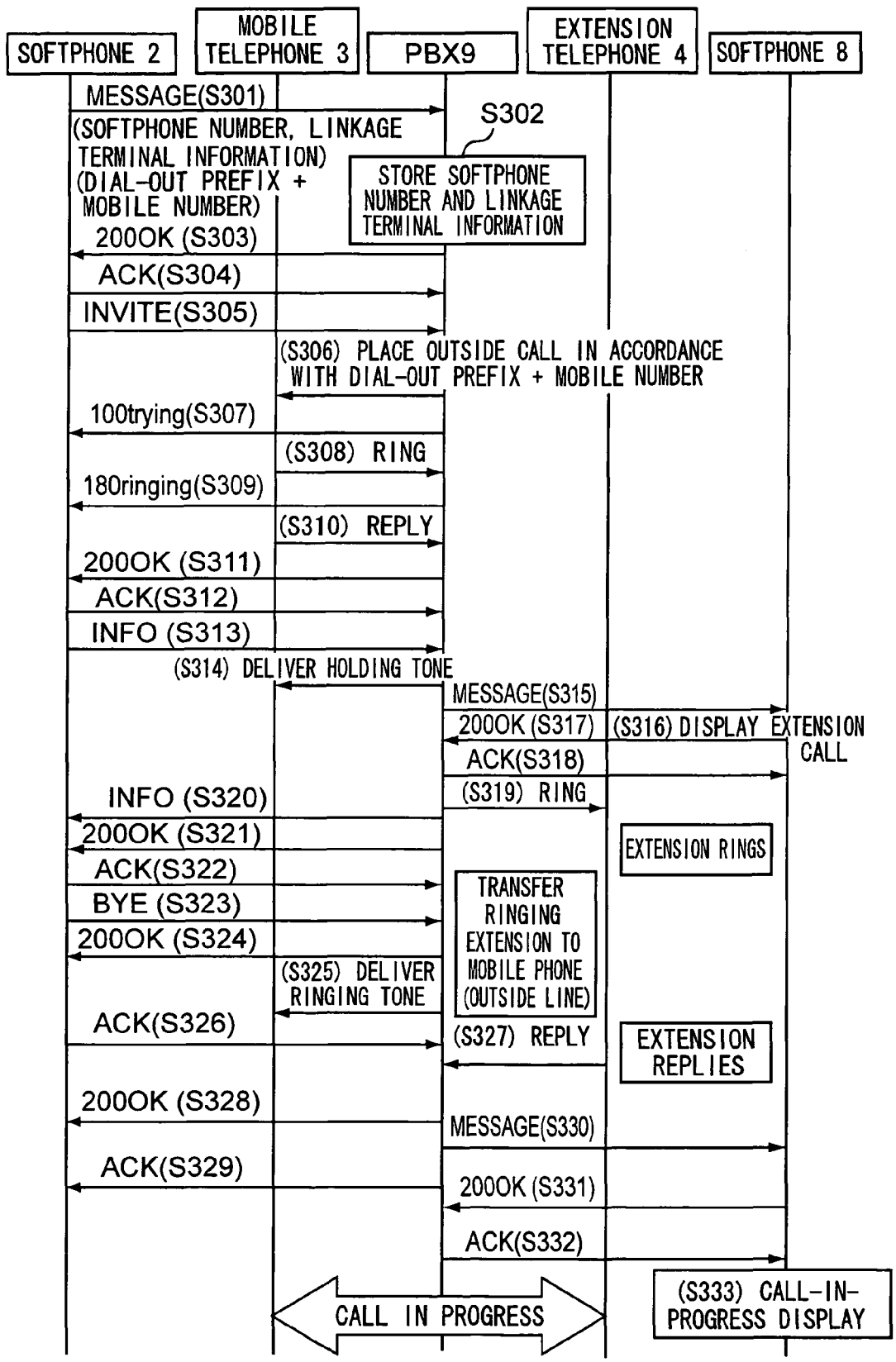
FIG. 10 is a sequence diagram showing linkage processing between the softphone and the hardphone of the third embodiment.

FIG. 9 is an explanatory diagram explaining the configuration of an exchange system 300 of the third embodiment and a linkage operation between a softphone and a hardphone. Further, FIG. 10 is a sequence diagram showing the operation of linkage processing between the softphone and the hardphone in the exchange system 300 of the third embodiment.

The third embodiment differs from the configuration of the first embodiment in that a softphone 8 is newly added to the configuration of the exchange system 100 of the first embodiment, and in terms of the function of a PBX 9. Other components are the same as those in the first embodiment, so detailed description of their configurations will be omitted.

The PBX 9 is equipped with the same components as those of the PBX 1 of the first embodiment. In the PBX 9, the linkage status notification section 113 gives notification of the linkage status not only to the call source softphone 2 but also the softphone 8 of the call destination user.

Figure 11:
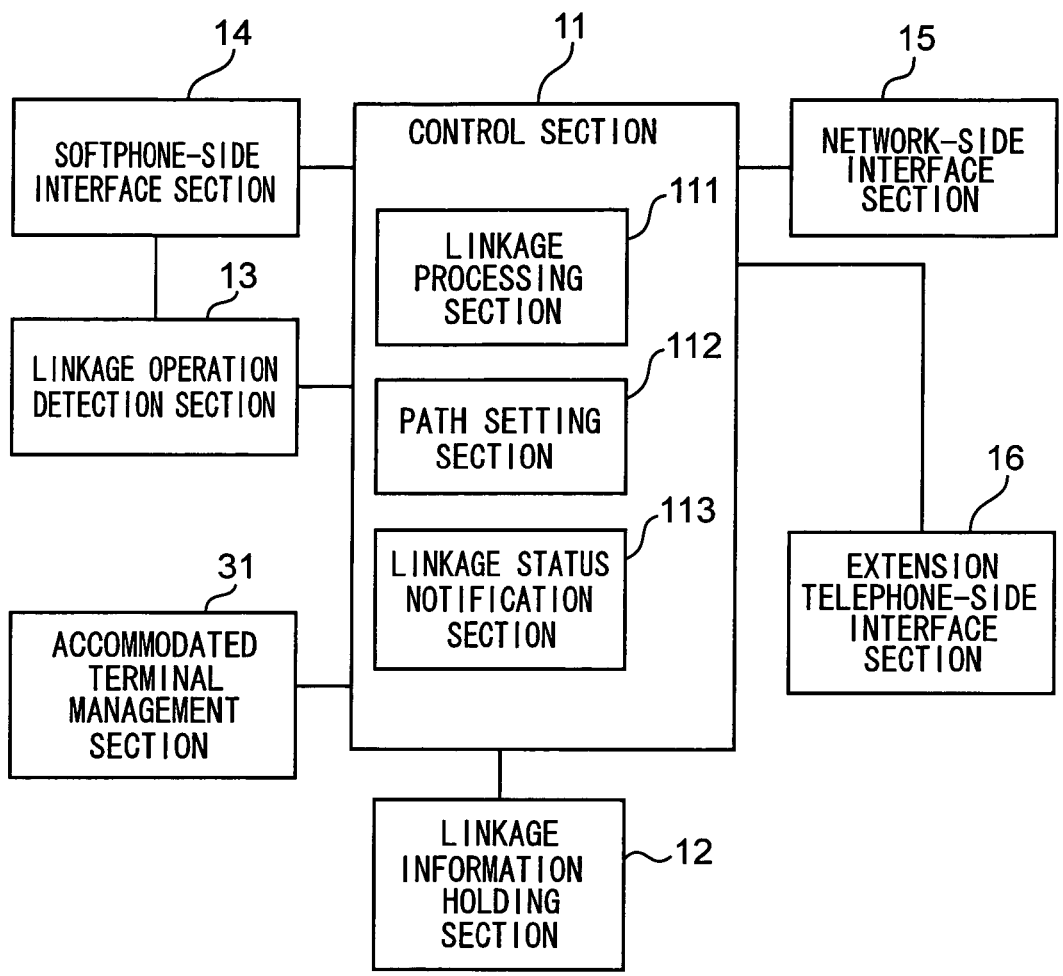
FIG. 11 is an internal configuration diagram showing the internal configuration of a PBX of the third embodiment.

FIG. 11 is a block diagram showing the main functional configuration of the PBX 9. As shown in FIG. 11, the PBX 9 is, in addition to the functional configuration of the first embodiment shown in FIG. 2, newly equipped with an accommodated terminal management section 31.

The accommodated terminal management section 31 manages the extension numbers of the accommodated extension telephone 4 and the softphones 2 and 8. Further, the accommodated terminal management section 31 establishes a correspondence between and manages the extension telephone 4 utilized by a certain user and the softphones 2 and 8.

When the linkage status notification section 113 rings the extension telephone 4 which is the linkage processing section 111 call destination, it gives notification of the extension call with respect to the softphone 8, corresponding to the extension phone number of the extension telephone 4 which is this call destination.

Further, when a call path with the extension telephone 4 which is the call destination has been established by the path setting section 112, the linkage status notification section 113 gives notification that a call is in progress with respect to the softphone 8 corresponding to the extension phone number of the extension telephone 4 which is the call destination.

The softphone 8 is an application having the same phone functions as those of the softphone 2 and is installed on a personal computer.

The operation of linkage processing in the exchange system 300 of the third embodiment will be described using FIG. 9 and FIG. 10.

Like in the first embodiment, because of a PC operation by the caller, the linkage operation reception section 21 of the softphone 2 detects the start of the linkage operation, the linkage terminal information creation section creates the linkage terminal information, and the call processing section 23 transmits information (MESSAGE), including the softphone number and the linkage terminal information, to the PBX 9 (S301 in FIG. 10). Here, as described above, the linkage terminal information is information including the dial-out prefix and the mobile phone number of the mobile telephone 3.

In the PBX 9, when the linkage operation detection section 13 detects the linkage terminal information, the linkage processing section 111 of the control section 11 stores the softphone number and the linkage terminal information in the linkage information holding section 12 (S302 in FIG. 10).

When the softphone number and the linkage terminal information are stored in the PBX 9 (S303 and S304 in FIG. 10), the caller utilizes the phonebook held by the softphone 2 to perform a call operation using the extension telephone 4 as the call destination (S31 in FIG. 9, S305 in FIG. 10).

When it receives a call request from the softphone 2 to the extension telephone 4, in the PBX 9, the linkage processing section 111 uses the mobile phone number of the mobile telephone 3 held in the linkage information holding section 12 to place a call to the mobile telephone 3 via the public network/mobile carrier network 5 (S32 in FIG. 9, S306 in FIG. 10), and ring the mobile telephone 3 (S33 in FIGS. 9, S307 to S309 in FIG. 10).

When it receives the ring from the PBX 9 and the user operates the mobile telephone 3 and replies (S34 in FIG. 9, S310 in FIG. 10), the PBX 9 notifies the softphone 2 thereof (S311 and S312 in FIG. 10).

Then, when it confirms that the mobile telephone 3 has replied, the softphone 2 requests the PBX 9 to call the call-designated extension telephone 3 (S313 in FIG. 10).

Receiving this, the PBX 9 delivers a holding tone to the mobile telephone 3 (S314 in FIG. 10), and thereafter the linkage status notification section 113 of the PBX 9 references the accommodated terminal management section 31, and notifies the softphone 8 corresponding to the extension number of the extension telephone 4, that there is an extension call to the extension telephone 4 (MESSAGE) (S315 in FIG. 10).

Thus, an indication of the extension call can be displayed on the PC with respect to the softphone 8 used by the call destination user (steps S316 to S318 in FIG. 10). The softphone 8 displays "Receiving call", for example, on the PC screen.

Further, the linkage processing section 111 of the PBX 9 performs ringing of the extension telephone 4 (S35 in FIG. 9, S319 in FIG. 10).

The PBX 9 notifies the softphone 2 that it has placed a call to the extension telephone 4 (S320 to S324 in FIG. 10), and delivers a ringing tone indicating that it is ringing the extension telephone to the mobile telephone 3 (S325, S326 in FIG. 10).

When the extension telephone 4 that has received the ring from the PBX 9 replies (S36 in FIG. 9, S327 in FIG. 10), in the PBX 9, the path setting section 112 establishes a path between the mobile telephone 3 and the extension telephone 4 (S37 in FIG. 9).

At this time, the linkage status notification section 113 of the PBX 9 notifies the softphone 8 of a MESSAGE indicating that a call is in progress between the mobile telephone 3 and the extension telephone 4 (S38 in FIGS. 9, S330 to S332 in FIG. 10). Thus, an indication that a call is in progress between the extension telephone 4 and the mobile telephone 3 because of linkage processing can be displayed on the PC screen of the softphone 8 (S333 in FIG. 10).

The softphone 8 displays "Call in progress", for example, on the PC screen.

The PBX 9 may also, like in the first embodiment, be configured to notify the call source softphone 2 that a call is in progress between the extension telephone 4 and the mobile telephone 3 because of linkage processing.

(C-2) Effects of Third Embodiment

As described above, according to the third embodiment, in addition to the effects of the first embodiment, the softphone 8 used by the call destination user can also be notified of the linkage status, such as that there is an extension call or that a call is in progress.

(D) Fourth Embodiment

Next, a fourth embodiment of the linkage system, the linkage method, the linkage program, and the exchange of the present invention will be described with reference to the drawings.

(D-1) Fourth Embodiment and Operation

In the fourth embodiment, an embodiment where linkage is performed between a hardphone and a softphone at the time a call is in progress in the third embodiment will be described.

Figure 12:
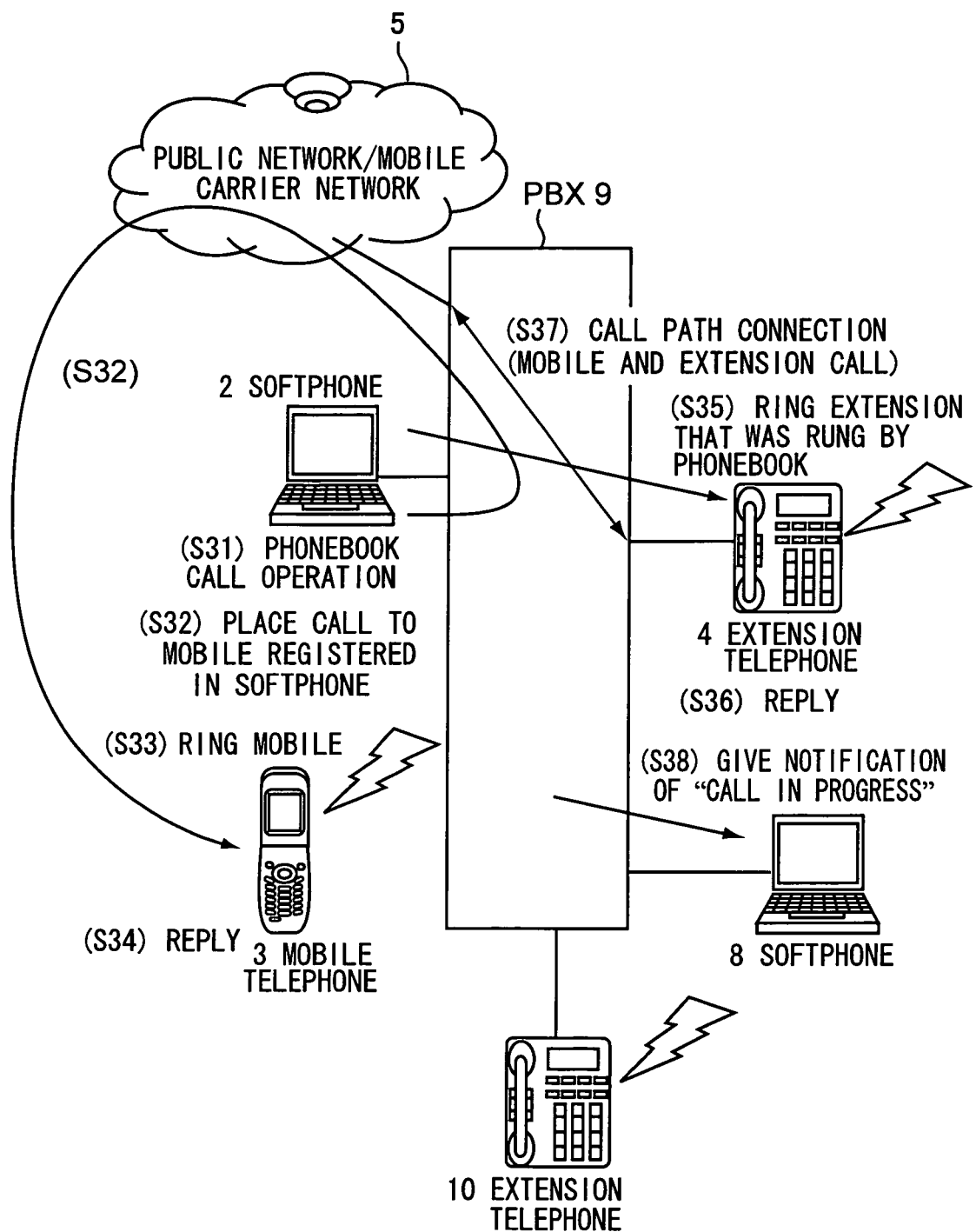
FIG. 12 is a configuration diagram showing the configuration of an exchange system of a fourth embodiment.
Figure 13:
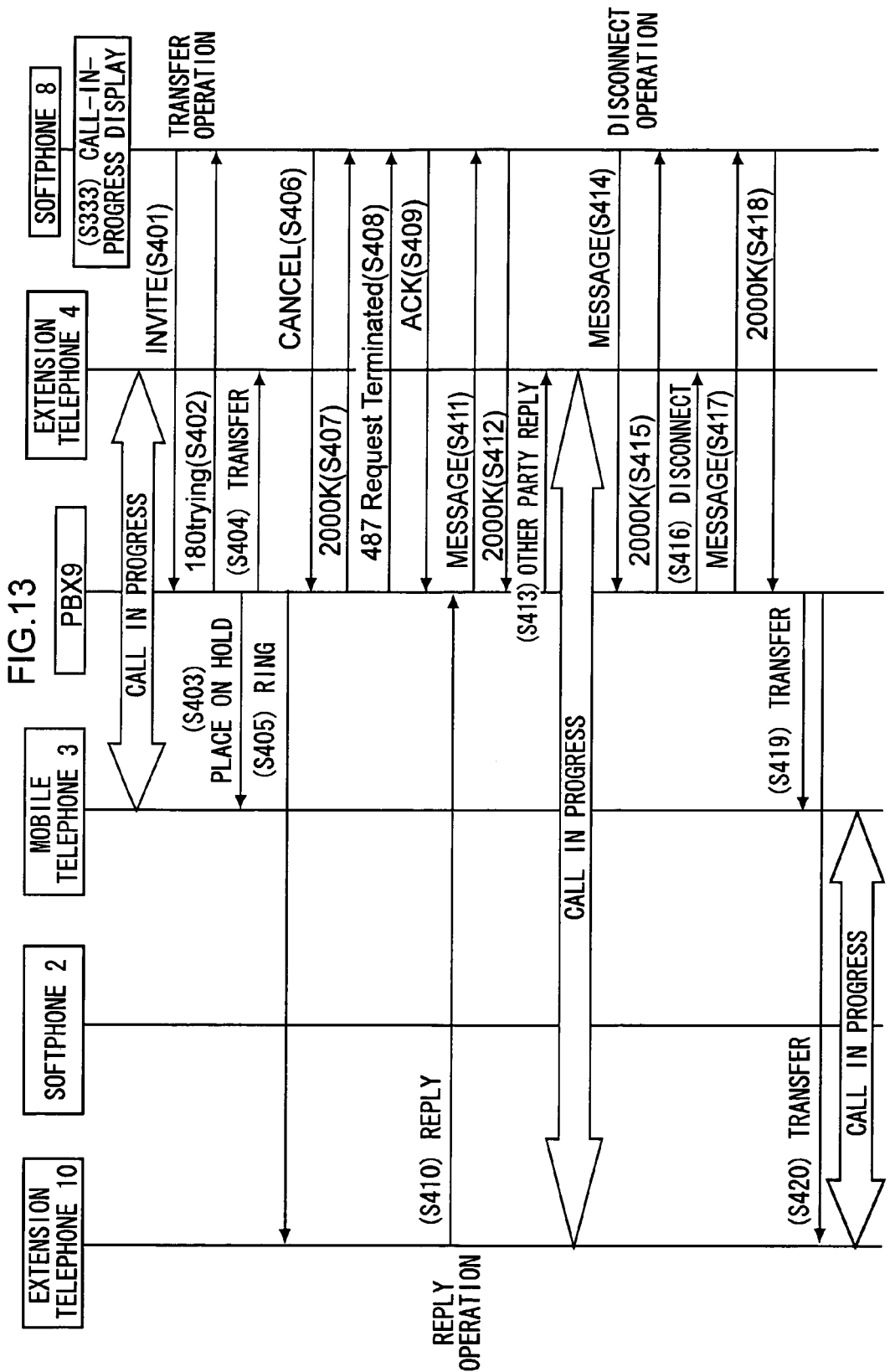
FIG. 13 is a sequence diagram showing an operation of linkage processing relating to an in-call transfer of the fourth embodiment.

The configuration of the fourth embodiment is one where, as shown in FIG. 12, an extension telephone 10 is newly included in the exchange system 300 shown in FIG. 9. The extension telephone 10 is the same as the extension telephone 4. Further, FIG. 13 is a sequence diagram showing an operation of linkage processing relating to an in-call transfer in the exchange system 300 of the fourth embodiment.

Namely, a call was in progress between the mobile telephone 3 and the extension telephone 4, in the third embodiment.

At this time, the softphone 8 that is receiving notification of the linkage status of the extension telephone 4 performs a transfer operation to transfer the call of the extension telephone 4 to the extension telephone 10, and establish a call between the mobile telephone 3 and the extension telephone 10.

The fourth embodiment differs from the configuration of the third embodiment in terms of the function of the PBX 9 of the exchange system 300 of the third embodiment. Further, it also differs in that the PBX 9 accommodates the extension telephone 10. Other components are the same as those in the third embodiment, so detailed description of their configurations will be omitted.

When the control section 11 performs processing of a transfer request, it judges whether there is a transfer request in the linkage operation when a transmission source of the transfer request is included in the linkage information holding section 12, or the accommodated terminal management section 31 and the terminal corresponding to the transmission source of the transfer request is in the middle of a call.

Here, the terminal corresponding to the transmission source of the transfer request is a terminal that has been saved as a pair in the transmission source of the transfer request in the linkage information holding section 12 or the accommodated terminal processing section 31.

When the control section 11 judges there is a transfer request in the linkage operation, it places on hold the other party of the terminal corresponding to the transmission source of the transfer request. Further, the control section 11 transfers the terminal corresponding to the transmission source of the transfer request on the basis of the transfer destination included in the transfer request and rings the transfer destination. Moreover, when the control section 11 obtains a reply from the transfer destination, it notifies the terminal corresponding to the transmission source of the transfer request of the reply, and sets a call path between the transfer destination and the terminal corresponding to the transmission source of the transfer request.

Further, when the control section 11 receives a disconnect request from the transmission source of the transfer request, it disconnects the terminal corresponding to the transmission source of the transfer request that it transferred.

Moreover, the control section 11 sets a call path between the other party of the terminal corresponding to the transmission source of the transfer request that it placed on hold and the transfer destination.

When the control section 11 performs processing of the transfer request in the linkage operation, the linkage status notification section 113 notifies the transmission source of the transfer request that a call is in progress with the transfer destination.

Further, when the linkage status notification section 113 performs processing of the control section 11 disconnect request, it notifies the transmission source of the disconnect request that it has terminated the call with the transfer destination.

An operation of linkage processing relating to an in-call transfer in the exchange system 300 of the fourth embodiment will be described using FIG. 13.

As described in the third embodiment, the softphone 8 is notified of the linkage status and a call-in-progress display (S333 in FIG. 13) is displayed while a call is in progress between the mobile telephone 3 and the extension telephone 4.

Here, in the softphone 8, when the operator utilizes the phonebook held by the softphone 8 to perform a transfer operation whose transfer destination is the extension telephone 10, the softphone 8 transmits a transfer request (S401 in FIG. 13), and the PBX 9 receives the transfer request (S402 in FIG. 13).

When the PBX 9 receives the transfer request, the control section 11 judges there is a transfer request in the linkage operation because the transmission source of the transfer request (the softphone 8) is included in the accommodated terminal management section 31 and the terminal (the extension telephone 4) corresponding to the transmission source of the transfer request is in the middle of a call.

When the control section 11 judges there is a transfer request in the linkage operation, it places on hold the other party (the mobile telephone 3) of the terminal (the extension telephone 4) corresponding to the transmission source of the transfer request (S403 in FIG. 13) Next, the control section 11 transfers the terminal (the extension telephone 4) corresponding to the transmission source of the transfer request on the basis of the transfer destination (the extension telephone 10) included in the transfer request (S404 in FIG. 13), and rings the transfer destination (S405 in FIG. 13). When the control section 11 obtains a reply from the transfer destination (the extension telephone 10) (S410 in FIG. 13), it notifies the terminal (the extension telephone 4) corresponding to the transmission source of the transfer request of the reply (S413 in FIG. 13), and sets a call path between the transfer destination (the extension telephone 10) and the terminal (the extension telephone 10) corresponding to the transmission source of the transfer request.

Here, when the control section 11 places the mobile telephone 3 on hold, the PBX 9 delivers a holding tone to the mobile telephone 3, and when it transfers the extension telephone 4, the PBX 9 delivers a ringing tone to the extension telephone 4.

Meanwhile, the softphone 8 which is the transmission source of the transfer request automatically cancels the request (S406 to S409 in FIG. 13) as a result of the PBX 9 receiving the transfer request (S402 in FIG. 13).

Further, when the control section 11 of the PBX 9 rings the transfer destination (S405 in FIG. 13) and obtains a reply from the transfer destination (the extension telephone 10) (S410 in FIG. 13), the linkage status notification section 113 notifies the transmission source of the transfer request (the softphone 8) of a MESSAGE that a call is in progress between the extension telephone 4 and the extension telephone 10 (S411 to S412 in FIG. 13).

At this time, the softphone 8 displays on the PC screen content indicating that a call is in progress, such as "Call in progress", for example, on the basis of the notification.

Here, in the softphone 8, when the operator performs a disconnect operation, the softphone 8 transmits a disconnect request, (S414 in FIG. 13), and the PBX 9 receives the disconnect request (S415 in FIG. 13).

When the PBX 9 receives the disconnect request from the transmission source of the transfer request (the softphone 8), the control section 11 disconnects the terminal (the extension telephone 4) corresponding to the transmission source of the transfer request that it transferred (S404 in FIG. 13) (S416 in FIG. 13).

Moreover, the control section 11 sets a call path between the other party (the mobile telephone 3) of the terminal corresponding to the transmission source of the transfer request that it placed on hold (S403 in FIG. 13), and the transfer destination (the extension telephone 10) (S419 to S420 in FIG. 13).

Further, when the control section 11 of the PBX 9 disconnects the terminal (the extension telephone 4) corresponding to the transmission source of the transfer request (S416 in FIG. 13), the linkage status notification section 113 notifies the transmission source of the disconnect request (the softphone 8) that it has terminated the call (S417 to S418 in FIG. 13).

At this time, the softphone 8 displays on the PC screen content indicating the disconnection, such as "Disconnected", for example, on the basis of the notification.

(D-2) Effects of Fourth Embodiment

As described above, according to the fourth embodiment, in addition to the effects of the third embodiment, when the user uses the extension telephone 4 and the softphone 8 and is in the middle of a call on the extension telephone 4, transfer of the call of the extension telephone 4 can be performed by the linkage operation of a transfer from the softphone 8, and the softphone 8 can be notified of the linkage status, such as that a call is in progress with the transfer destination or an indication of disconnection.

(E) Fifth Embodiment

Next, a fifth embodiment of the linkage system, the linkage method, the linkage program, and the exchange of the present invention will be described with reference to the drawings.

(E-1) Fifth Embodiment and Operation

In the fifth embodiment, an embodiment where linkage between a hardphone and a thin client (TC) softphone is performed will be described.

An embodiment in a case where, even when a private branch exchange has a thin client function, an accommodated softphone is a TC softphone, and a linkage-operated hardphone is not connected to the private branch exchange accommodating the TC softphone, linkage processing between the hardphone and the TC softphone is performed, will be described.

That is, in the fifth embodiment, the softphone of the first embodiment (the softphone 2 in FIG. 1) is replaced with a TC softphone.

The configuration of the fifth embodiment is the same as that of the first embodiment as shown in FIG. 1.

The fifth embodiment differs from the configuration of the first embodiment in that the PBX 1 of the exchange system 100 of the first embodiment has a thin client server (TCS) function, and the PBX 1 accommodates a softphone 2 which is a TC softphone. Other components are the same as those in the first embodiment, so detailed description of their configurations will be omitted.

Figure 14:
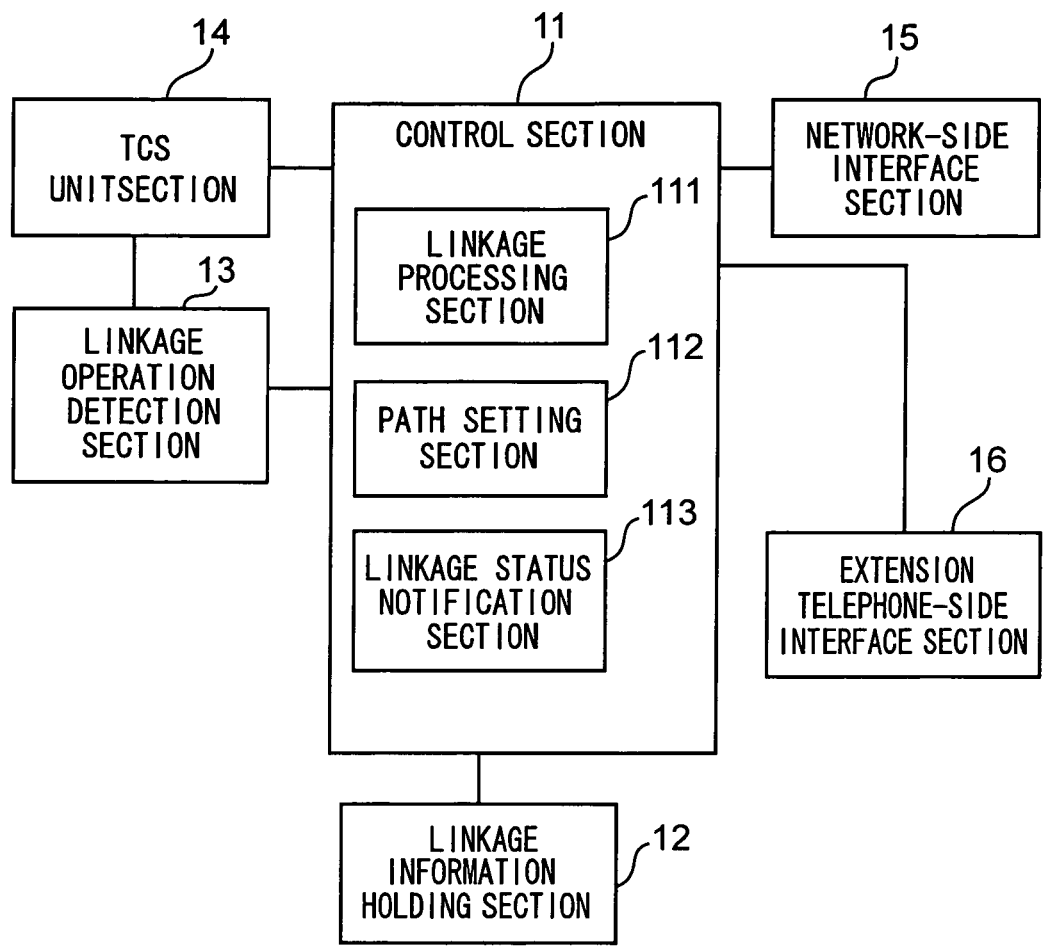
FIG. 14 is an internal configuration diagram showing the internal configuration of a PBX of a fifth embodiment.

FIG. 14 is an internal configuration diagram showing the main internal functions of the PBX 1. As shown in FIG. 14, the PBX 1 includes at least a control section 11, a linkage information holding section 12, a linkage operation detection section 13, a TCS section 14, a network-side interface 15, and an extension telephone-side interface section 16.

Namely, in the PBX 1 of the fifth embodiment, the softphone-side interface 14 of the PBX 1 of the first embodiment is replaced with the TCS section 14.

The TCS section 14 presides over the thin client server function that provides softphone functions to a personal computer.

That is, in the first embodiment, the softphone 2 was implemented on a personal computer. However, the softphone 2 of the fifth embodiment is realized as a result of softphone functions being provided from the TCS section 14. That is, for example, the PBX 1 provides softphone functions, such as a phonebook function, a call function, a function of confirming that the party the user wants to call is at his/her desk (a presence function), etc., to the personal computer of the softphone 2.

Specifically, the TCS section 14 executes and controls softphone functions on a memory (not shown) in FIG. 14 with respect to a request from the personal computer of the softphone 2, and sends screen information and the like, based on the control result to the personal computer of the softphone 2.

Due thereto, in the fifth embodiment, softphone functions are displayed on the screen of the personal computer of the softphone 2, and can operate as a softphone, and it becomes possible to operate the screen information to utilize softphone functions, such as a phonebook function, a call function, a function of confirming that the party the user wants to call is at his/her desk (a presence function), etc.

Further, in the fifth embodiment, a function by which the softphone 2 performs request processing of linkage processing with respect to the PBX 1 is also provided by the TCS section 14.

Consequently, the configuration of the softphone 2 of the fifth embodiment is the same as in the first embodiment as shown in FIG. 3. However, the linkage operation reception section 21, the linkage terminal information creation section 22, the call processing section 23, and the mobile number storage section 24 of the softphone 2 of the fifth embodiment are executed, controlled, and realized on the memory of the PBX 1.

The softphone 2 and the TCS section 14 correspond to the thin client protocol and can communicate with each other. Due thereto, the softphone 2 relays to the TCS section 14 the operations of the user as control information, and the TCS section 14 controls the softphone functions on the memory on the basis of the control information it has received. The TCS section 14 relays to the softphone 2 screen information and the like, based on the control result of the softphone functions on the memory.

The control section 11 performs linkage processing between the softphone functions of the softphone 2 and the mobile telephone 3. As functions of the linkage control performed by the control section 11, as shown in FIG. 14, there are the linkage processing section 111, the path setting section 112, and the linkage status notification section 113.

The linkage processing section 111 stores numbers of the softphone functions of the call source softphone 2 and linkage terminal information in the linkage information holding section 12, when the later-described linkage operation section 13 detects linkage terminal information. Thus, the linkage processing section 111 stores a correspondence relationship between the softphone functions of the linkage-operated softphone 2 and hardphone (the mobile telephone 3), in the linkage information holding section 12.

Further, the linkage processing section 111 performs call and ring processing of the mobile telephone 3 via the public network/mobile carrier network 5 on the basis of a phone number of the mobile telephone 3 included in the linkage terminal information it has received.

Moreover, when the linkage processing section 111 confirms a reply from the linkage-operated mobile telephone 3, it places the mobile telephone 3 on hold, and performs ring processing of the extension telephone 4 which is a call-designated call destination from the softphone functions of the softphone 2, which is the call source.

Further, when it performs extension ringing of the extension telephone 4, the linkage processing section 111 references the numbers of the softphone functions of the softphone 2 and the mobile number of the mobile telephone 3 in the linkage information holding section 12, extension-transfers the softphone functions of the softphone 2 to the mobile telephone 3, and places the mobile telephone 3 in ringing.

The path setting section 112 sets a call path between the mobile telephone 3 and the extension telephone 4 when there is a reply from the extension telephone 4.

The linkage status notification section 113 notifies the softphone functions of the softphone 2 that a call is in progress between the mobile telephone 3 and the extension telephone 4, when a call between the mobile telephone 3 which is the linkage target and the call destination extension telephone 4 is established.

The linkage information holding section 12 holds the phone number of the softphone functions of the softphone 2 which is the call source, and the linkage terminal information it has received from the softphone functions of the call source softphone 2.

The linkage operation detection section 13 monitors call information from the softphone functions of the softphone 2 which is the call source via the TCS section 14, and judges whether or not linkage terminal information has been transmitted. When the linkage operation detection section 13 detects reception of linkage terminal information, it relays an indication thereof to the control section 11 to cause the control section 11 to perform linkage processing.

The linkage operation reception section 21 executed and controlled by the TCS section 14 receives user operations and receives the start of linkage processing between the softphone functions of the softphone 2 and the mobile telephone 3. For example, the caller utilizes the phonebook held by the softphone functions of the softphone 2 to perform an operation that rings the extension telephone 4. Because of this, the linkage operation reception section 21 performs reception of linkage processing to the mobile telephone 3.

The linkage terminal information creation section 22, executed and controlled by the TCS section 14, detects the start of linkage processing to the mobile telephone 3 in the linkage operation reception section 21, and creates linkage terminal information using the mobile phone number of the mobile telephone 3 stored in the mobile number storage section 24.

Here, the linkage terminal information is, like in the first embodiment, information informing the PBX 1 of the mobile phone number of the mobile telephone 3 serving as the linkage target. That is, the linkage terminal information is, for example, information including a dial-out prefix and the mobile phone number of the mobile telephone 3.

The call processing section 23, executed and controlled by the TCS section 14, sends the linkage terminal information that has been created in the linkage terminal information creation section 22 to the PBX 1, on the basis of PC operations by the user.

The mobile number storage section 24, executed and controlled by the TCS section 14, is a storage region that stores beforehand the mobile phone number of the mobile telephone 3 serving as the linkage target.

The mobile telephone 3 is an existing mobile telephone carried by the user. In the fifth embodiment, description will be given in a case where a mobile telephone carried by the individual user who utilizes the softphone functions of the softphone 2.

Figure 15:
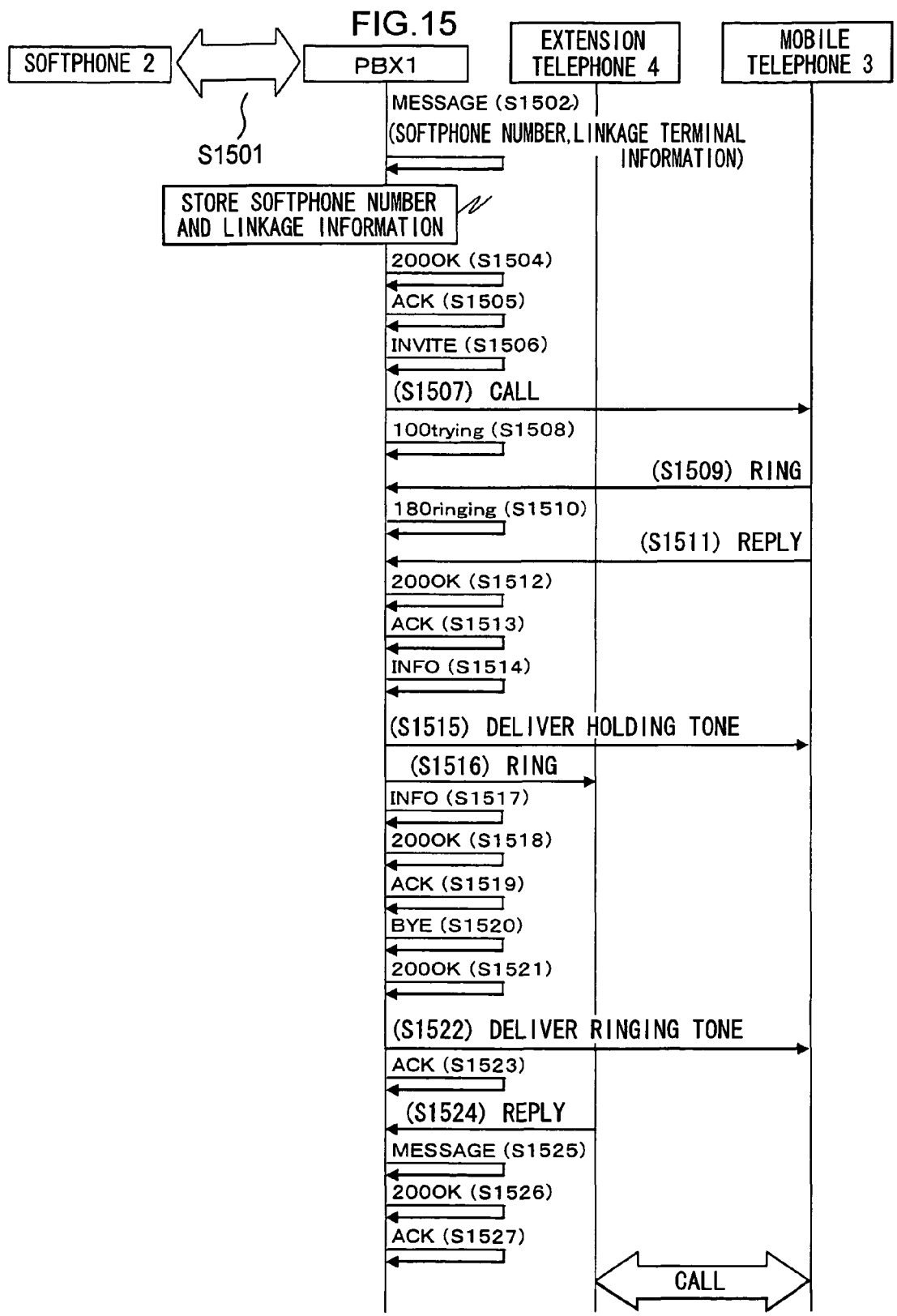
FIG. 15 is a sequence diagram showing linkage processing between a softphone and a hardphone of the fifth embodiment.
Figure 16:
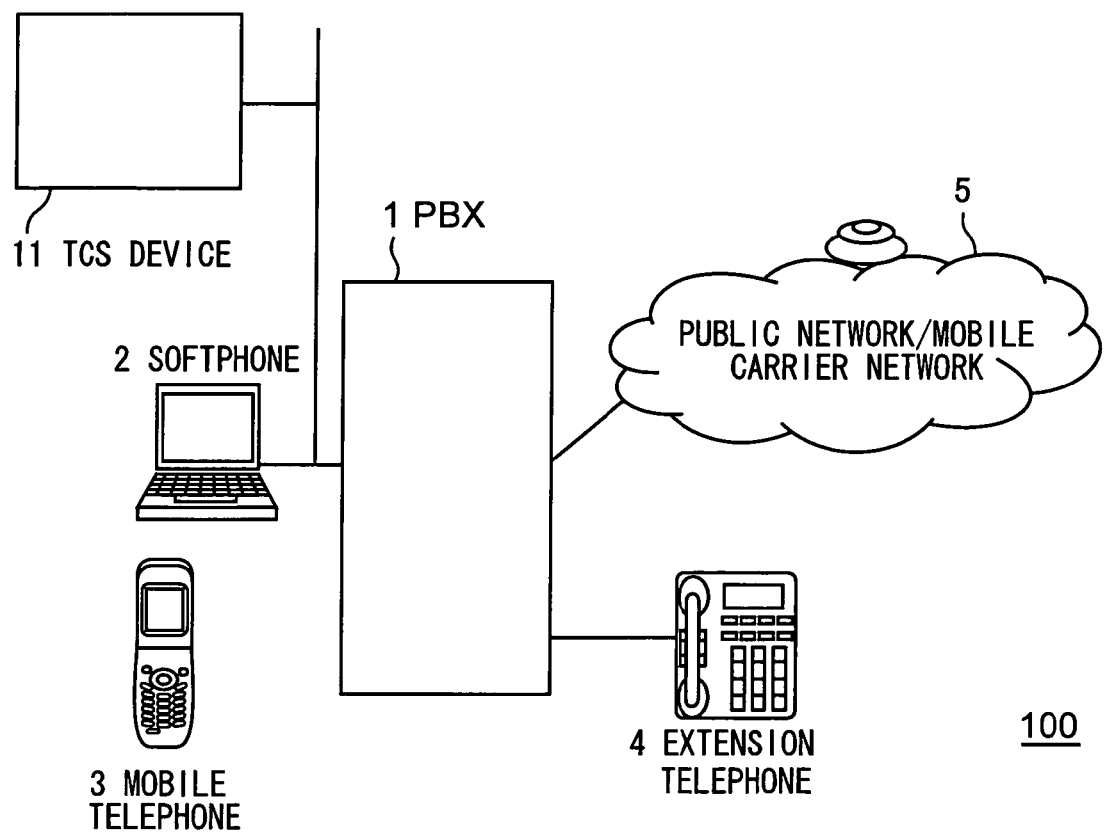
FIG. 16 is a configuration diagram showing the configuration of an exchange system of a sixth embodiment.

FIG. 15 is a sequence diagram showing linkage processing between the softphone 2 whose softphone functions are provided by the PBX 1 in the exchange system 100 of the fifth embodiment and the mobile telephone 3.

Next, the operation of the exchange system 100 of the fifth embodiment will be described.

First, thin client communication (S1501 in FIG. 15) begins between the softphone 2 and the PBX 1, because of a PC operation relating to startup of the softphone functions by the user, and the softphone functions are executed on the PBX 1. Next, the softphone functions are displayed on the screen of the personal computer and operate as a softphone.

Thereafter, thin client protocol communication appropriately becomes possible between the softphone 2 whose softphone functions are provided by the PBX 1 and the PBX 1.

The caller performs an operation that rings the mobile telephone 4 with the softphone 2. This operation is relayed to the TCS section 14 of the PBX 1 as control information, and the linkage operation reception section 21, executed and controlled by the TCS section 14, detects the start of the linkage operation. Next, the linkage terminal information creation section 22 creates the linkage terminal information. Next, the call processing section 23 transmits information (MESSAGE), including the numbers of the softphone functions and the linkage terminal information, to the PBX 1 (S1502 in FIG. 15).

Here, as described above, the linkage terminal information is information including the dial-out prefix and the mobile phone number of the mobile telephone 3.

In the PBX 1, when the linkage operation detection section 13 detects the linkage terminal information, the linkage processing section 111 of the control section 11 stores the numbers of the softphone functions and the linkage terminal information in the linkage information holding section 12 (S1503 in FIG. 15).

When the numbers of the softphone functions and the linkage terminal information are stored in the PBX 1 (S1503 and S1505 in FIG. 15), the softphone functions of the softphone 2 make a call using the extension telephone 4 as the call destination (S1506 in FIG. 15).

When it receives the call request from the softphone functions of the softphone 2 to the extension telephone 4, in the PBX 1, the linkage processing section 111 uses the mobile phone number of the mobile telephone 3, held in the linkage information holding section 12, to place a call to the mobile telephone 3 via the public network/mobile carrier network 5 (S1507 in FIG. 15), and ring the mobile telephone 3 (S1508 to S1510 in FIG. 15).

When it receives the ring from the PBX 1 and the user operates the mobile telephone 3 and replies (S1511 in FIG. 15), the PBX 1 notifies the softphone functions of the softphone 2 thereof (S1512 and S1513 in FIG. 15).

Then, when they confirm that the mobile telephone 3 has replied, the softphone functions of the softphone 2 request the PBX 1 to call the call-designated extension telephone 4 (S1514 in FIG. 15). Receiving this, the PBX 1 delivers a holding tone to the mobile telephone 3. Thereafter (S1515 in FIG. 15), the linkage processing section 111 places a call to the extension telephone 4 (S1516 in FIG. 15).

The PBX 1 notifies the softphone functions of the softphone 2 that it has placed a call to the extension telephone 4 (S1517 to S1521 in FIG. 15). Next, the PBX 1 delivers a ringing tone indicating that it is ringing the extension telephone 4 to the mobile telephone 3 (S1522, S1523 in FIG. 15).

When the extension telephone 4 that has received the ring from the PBX 1 replies (S1524 in FIG. 15), in the PBX 1, the path setting section 112 establishes a path between the mobile telephone 3 and the extension telephone 4. Next, the linkage status notification section 113 notifies the softphone functions of the softphone 2 that a call is in progress between the mobile telephone 3 and the extension telephone 4 (S1525 to S1527 in FIG. 15).

At this time, with respect to the softphone functions of the softphone 2 executed and controlled by the TCS section 14, control that displays content indicating that a call is in progress, such as "Call in progress", for example", is performed, and "Call in progress" is displayed on the screen of the softphone 2.

(E-2) Effects of Fifth Embodiment

As described above, according to the fifth embodiment, even when a hardphone is not connected to a PBX having a thin client function accommodating a thin client softphone, linkage processing between the thin client softphone and the hardphone can be performed and notification that the thin client softphone and the hardphone are linked can be given.

(F) Sixth Embodiment

Next, a sixth embodiment of the linkage system, the linkage method, the linkage program, and the exchange of the present invention will be described with reference to the drawings.

(F-1) Sixth Embodiment and Operation

In the sixth embodiment, an embodiment where, like in the fifth embodiment, linkage between a hardphone and a TC softphone is performed will be described.

An embodiment in a case where, even when a private branch exchange does not have a thin client function, an accommodated softphone is a TC softphone, and a linkage-operated hardphone is not connected to the private branch exchange accommodating the TC softphone, linkage processing between the hardphone and the TC softphone is performed, will be described.

The configuration of the sixth embodiment is, as shown in FIG. 6, one where the softphone of the first embodiment (the softphone 2 in FIG. 1) is replaced with a TC softphone and where a TCS device 11 that provides softphone functions is added. Other components are the same as those in the first embodiment, so detailed description of their configurations will be omitted.

The TCS device 11 of the sixth embodiment is a server device having the function of performing the same processing as that of the TCS section 14 described in the fifth embodiment. The TCS device 11 executes and controls the softphone functions on a memory inside the TCS device 11, and sends screen information and the like based on the control result to the personal computer of the softphone 2.

Further, the TCS device 11, the softphone 2, and the PBX 1 are configured such that they are connected via a network and can communicate with each other.

FIG. 17 is a sequence diagram showing linkage processing between the softphone 2 whose softphone functions are provided by the TCS device 11 in the exchange system 100 of the sixth embodiment and the mobile telephone 3.

The operation of the exchange system 100 of the sixth embodiment will be described.

First, thin client communication (S 1701 in FIG. 17) begins between the softphone 2 and the TCS device 11 because of a PC operation relating to the startup of the softphone functions by the user, and the softphone functions are executed on the TCS device 11. Thus, as for the softphone 2, the softphone functions are displayed on the screen of the personal computer and operate as a softphone.

Thereafter, between the softphone 2 whose softphone functions are provided by the TCS device 11 and the PBX 1, thin client protocol communication appropriately becomes possible.

The caller performs an operation that rings the extension telephone 4 with the softphone 2. This operation is relayed to the TCS device 11 as control information, and the linkage operation reception section 21 executed and controlled by the TCS device 11 detects the start of the linkage operation. Next, the linkage terminal information creation section 22 creates the linkage terminal information. Moreover, the call processing section 23 transmits information (MESSAGE), including the number of the softphone function and the linkage terminal information, to the PBX 1 (S1702 in FIG. 17).

Here, as described above, the linkage terminal information is information including the dial-out prefix number and the mobile phone number of the mobile telephone 3.

Thereafter, the operation of S1703 to S1723 in FIG. 17 of the sixth embodiment is the same as the description of S1503 to S1523 in FIG. 15 of the fifth embodiment, so description thereof will be omitted.

When the extension telephone 4 that has received the ring from the PBX 1 replies (S1724 in FIG. 17), in the PBX 1, the path setting section 112 establishes a path between the mobile telephone 3 and the extension telephone 4. Next, the linkage status notification section 113 notifies the softphone functions of the softphone 2 that a call is in progress between the mobile telephone 3 and the extension telephone 4 (S1725 to S1727 in FIG. 17).

At this time, with respect to the softphone functions of the softphone 2 executed and controlled by the TCS device 11, control that displays content indicating that a call is in progress, such as "Call in progress", for example, is performed, and "Call in progress" is displayed on the screen of the softphone 2.

(F-2) Effects of Sixth Embodiment

As described above, according to the sixth embodiment, even when a hardphone is not connected to a PBX not having a thin client function accommodating a thin client softphone, linkage processing between the thin client softphone and the hardphone can be performed and notification that the thin client softphone and the hardphone are linked can be given.

(G) Other Embodiments (G-1) The linkage processing of the exchange described in the first to sixth embodiments is realized by software processing. That is, the linkage processing is realized as a result of a CPU with which the exchange is equipped executing a processing program that is stored in a storage device and realizes linkage processing.

(G-2) In the third embodiment, a case where the linkage status notification section notifies the softphone 8 of the call destination user of the linkage status was exemplified, however, the linkage status notification section may also notify the call source softphone of the linkage status.

Further, the linkage status notification section may also give notification of the linkage status not only to the softphone 2 of the call destination user but also to a softphone from which a presence inquiry has been made by a presence function as a result of the PBX 1 managing the status of the linkage processing.

Moreover, in the third embodiment, a case where it was applied to the configuration of the first embodiment where a PBX accommodates a softphone and an extension telephone was exemplified, however, it may also be applied to the second embodiment. In this case, for example, the PBX-B is equipped with an accommodated terminal management section, and, like in the third embodiment, the linkage status notification section notifies the call source and/or the call destination softphone of the linkage status, whereby it can be realized.

The invention claimed is:

1. A linkage system that allows a private branch exchange that is connected to a softphone terminal having a phone function to establish a call between a mobile telephone that is not accommodated in the private branch exchange and an extension telephone that is connected to the private branch exchange and that is a call destination, the linkage system comprising:
    a linkage information registration section that stores a number of the softphone terminal and linkage terminal information that have been received by the private branch exchange from the softphone terminal when a user of the softphone terminal seeks to establish the call between the mobile terminal and the extension telephone, the linkage terminal information including a telephone number of the mobile telephone;
    a call processing section that makes a call to the mobile telephone, via a public communication network that includes a public telephone network and a mobile carrier network, on the basis of the linkage terminal information of the mobile telephone in the linkage information registration section;
    a ring processing section that causes the extension telephone to ring when an incoming reply is received by the private branch exchange from the mobile telephone via the public communication network;
    a path setting section that sets a call path between the mobile telephone and the extension telephone when the private branch exchange receives a reply from the extension telephone; and
    a linkage status notification section that gives notification of a linkage status indicating that a call is in progress between the mobile telephone and the extension telephone to the softphone terminal.

2. The linkage system according to claim 1, wherein the call processing section makes a call request to the mobile telephone via the public communication network based on a dial-out prefix and a phone number of the mobile telephone which are included in the linkage terminal information.

3. A linkage method that allows a private branch exchange that is connected to a softphone terminal having a phone function to establish a call between a mobile telephone that is not accommodated in the private branch exchange and an extension telephone that is connected to the private branch exchange and that is a call destination,
    with a linkage system of the private branch exchange being equipped with a linkage information registration section that stores a number of the softphone terminal and linkage terminal information that have been received by the private branch exchange from the softphone terminal when a user of the softphone terminal seeks to establish the call between the mobile terminal and the extension telephone, the linkage terminal information including a telephone number of the mobile telephone, the linkage system additionally being equipped with a call processing section, a ring processing section, and a path setting section,
    the linkage method comprising:
    a call processing step in which the call processing section makes a call to the mobile telephone, via a public communication network that includes a public telephone network and a mobile carrier network, based on the linkage terminal information of the mobile telephone in the linkage information registration section;
    a ring processing step in which the ring processing section causes the extension telephone to ring when the private branch exchange receives an incoming reply from the mobile telephone via the public communication network;
    a path setting step in which the path setting section sets a call path between the mobile telephone and the extension telephone when the private branch exchange receives a reply from the extension telephone; and
    a linkage status notification section that gives notification of a linkage status indicating that a call is in progress between the mobile telephone and the extension telephone to the softphone terminal.

4. A non-transitory computer readable recording medium storing a linkage program that allows a private branch exchange that is connected to a softphone terminal having a phone function to establish a call between a mobile telephone that is not connected to the private branch exchange and an extension telephone that is connected to the private branch exchange and that is a call destination, the linkage program causing the private branch exchange, which is equipped with a linkage information registration section that stores a number of the softphone terminal and linkage terminal information that have been received by the private branch exchange from the softphone terminal when a user of the softphone terminal seeks to establish a call between the mobile telephone and the extension telephone, to function as:

a call processing section that makes a call to the mobile telephone, via a public communication network that includes a public telephone network and a mobile carrier network, based on the linkage terminal information of the mobile telephone in the linkage information registration section;

a ring processing section that causes the extension telephone to ring when the private branch exchange receives an incoming reply from the mobile telephone via the public communication network;

a path setting section that sets a call path between the mobile telephone and the extension telephone when the private branch exchange receives a reply from the extension telephone; and a linkage status notification section that gives notification of a linkage status indicating that a call is in progress between the mobile telephone and the extension telephone to the softphone terminal, wherein the linkage information includes a telephone number of the extension telephone.

5. A private branch exchange that accommodates a softphone terminal having a phone function, wherein the private branch exchange is equipped with the linkage system according to claim 1.

* * * * *